US012594518B2

(12) United States Patent
Han

(10) Patent No.: US 12,594,518 B2
(45) Date of Patent: Apr. 7, 2026

(54) AIR PURIFICATION APPARATUS

(71) Applicant: KHANFILTER, INC., Daejeon (KR)

(72) Inventor: Dae Gon Han, Daejeon (KR)

(73) Assignee: KHANFILTER, INC., Daejeon (KR)

( * ) Notice: Subject to any disclaimer, the term of this patent is extended or adjusted under 35 U.S.C. 154(b) by 609 days.

(21) Appl. No.: 17/920,064

(22) PCT Filed: Apr. 9, 2021

(86) PCT No.: PCT/KR2021/004505
§ 371 (c)(1),
(2) Date: Oct. 20, 2022

(87) PCT Pub. No.: WO2021/215721
PCT Pub. Date: Oct. 28, 2021

(65) Prior Publication Data
US 2023/0166209 A1 Jun. 1, 2023

(30) Foreign Application Priority Data

| Apr. 23, 2020 | (KR) | ......................... | 10-2020-0049600 |
| Apr. 23, 2020 | (KR) | ......................... | 10-2020-0049601 |
| Apr. 23, 2020 | (KR) | ......................... | 10-2020-0049602 |

(51) Int. Cl.
*B01D 46/82* (2022.01)
*B01D 46/44* (2006.01)
*B01D 46/46* (2006.01)

(52) U.S. Cl.
CPC ........... *B01D 46/82* (2022.01); *B01D 46/448* (2013.01); *B01D 46/46* (2013.01)

(58) Field of Classification Search
CPC .... F24F 7/003; F24F 11/65; F24F 8/10; F24F 13/10; F24F 2110/50; F24F 11/70;
(Continued)

(56) References Cited

U.S. PATENT DOCUMENTS

| 10,888,812 | B2 | 1/2021 | Han | |
| 2004/0226352 | A1* | 11/2004 | Craig | ................. B01D 46/0086 |
| | | | | 73/114.73 |

(Continued)

FOREIGN PATENT DOCUMENTS

| JP | 5-240027 A | 9/1993 |
| JP | 5-332124 A | 12/1993 |

(Continued)

OTHER PUBLICATIONS

Japanese Office Action issued on Oct. 17, 2023, in counterpart Japanese Patent Application No. 2022-563459 (5 pages in English, 4 pages in Japanese).
(Continued)

*Primary Examiner* — Jennifer Dieterle
*Assistant Examiner* — Qianping He
(74) *Attorney, Agent, or Firm* — NSIP Law

(57) ABSTRACT

According to an embodiment of the present application, there may be provided an air purification apparatus for purifying polluted air and discharging the purified air, which comprises a main pipe including a first flow path, a second flow path, a first filter, a first main area, and a second main area. The air purification apparatus can operate in a filtering mode in which at least some contaminants contained in the air flowing into the main pipe are collected by the first filter, or a cleaning mode in which at least some of the contaminants collected by the first filter in the filtering mode are removed, wherein an operation section in the cleaning mode of the air purification apparatus includes a firs section and a second section, the first section and the second section are divided on the basis of a first division time point, and the rate of change of temperature in the first main area is varied before and after the first division time point.

11 Claims, 29 Drawing Sheets

(58) Field of Classification Search
CPC .. F24F 11/39; F24F 11/61; F24F 11/79; A61L
9/014; A61L 2209/111; A61L 2209/14;
B01D 46/429; B01D 46/442; B01D
46/46; B01D 2279/50; B01D 2279/30;
B01D 53/9495; B01D 46/84; B01D
46/44; B01D 46/448; B01D 53/30; G01N
33/0063; G01N 33/0075; G05B 15/02;
F01N 9/002; F01N 3/023; F01N
2900/1602; F01N 9/00; F01N 3/021;
F01N 13/017
USPC .......................................................... 96/405
See application file for complete search history.

(56) References Cited

U.S. PATENT DOCUMENTS

| | | | | |
|---|---|---|---|---|
| 2010/0223913 | A1* | 9/2010 | Girbach .................. | F01N 3/035 |
| | | | | 60/297 |
| 2011/0067571 | A1 | 3/2011 | Asano et al. | |
| 2013/0125753 | A1 | 5/2013 | Ono et al. | |
| 2019/0292964 | A1 | 9/2019 | Laube et al. | |
| 2020/0269177 | A1* | 8/2020 | Han ....................... | B01D 53/26 |
| 2021/0231322 | A1 | 7/2021 | Han | |

FOREIGN PATENT DOCUMENTS

| | | |
|---|---|---|
| JP | 2018-535832 A | 12/2018 |
| KR | 10-0861778 B1 | 10/2008 |
| KR | 10-2010-0001034 A | 1/2010 |
| KR | 10-1375902 B1 | 3/2014 |
| KR | 10-1554367 B1 | 9/2015 |
| KR | 10-2015-0146103 A | 12/2015 |
| KR | 10-2017-0060465 A | 6/2017 |
| KR | 10-2017-0063088 A | 6/2017 |
| KR | 10-2017-0140704 A | 12/2017 |
| KR | 10-2019-0136749 A | 12/2019 |
| KR | 10-2052638 B1 | 12/2019 |
| KR | 10-2020-0021236 A | 2/2020 |

OTHER PUBLICATIONS

Korean Office Action issued on May 14, 2021 in corresponding Korean Patent Application No. 10-2020-0049601 (9 pages in English, 7 pages in Korean).

Korean Office Action issued on Sep. 3, 2021 in corresponding Korean Patent Application No. 10-2020-0049602 (9 pages in English, 7 pages in Korean).

Korean Office Action issued on Nov. 22, 2021 in corresponding Korean Patent Application No. 10-2020-0049601 (2 pages in English, 2 pages in Korean).

Korean Office Action issued on Jan. 25, 2022 in corresponding Korean Patent Application No. 10-2020-0049602 (2 pages in English, 2 pages in Korean).

International Written Opinion issued on Aug. 31, 2022 in counterpart Patent Application No. PCT/KR2021/004505 (5 pages in Korean).

* cited by examiner

<u>2000</u>

4402  4404  4406

TEMPERATURE 4402       4404    4406      POSITION 4402  4404  4406

AIR PURIFICATION APPARATUS

CROSS REFERENCE TO RELATED APPLICATIONS

This application is a U.S. National Stage Application of International Application No. PCT/KR2021/004505, filed on Apr. 9, 2021, which claims the benefit under 35 USC 119(a) and 365(b) of Korean Patent Application No. 10-2020-0049600, filed on Apr. 23, 2020, No. 10-2020-0049601, filed on Apr. 23, 2020, and No. 10-2020-0049602, filed on Apr. 23, 2020, in the Korean Intellectual Property Office, the entire disclosure of which is incorporated herein by reference for all purposes.

TECHNICAL FIELD

The present invention relates to an air purification apparatus configured to purify air containing contaminants, and more specifically, to an air purification apparatus which may perform a cleaning operation of removing contaminants collected in a filter in a process of purifying air containing the contaminants.

BACKGROUND ART

Recently, particulate matter (PM) has become a social issue, and studies on air purification apparatuses configured to remove contaminants including the particulate matter are being actively conducted. Conventionally, in order to purify air, an air purification apparatus using an electrostatic precipitator (ESP) configured to remove particles by inducing polarity to the particles or filter media is widely used.

However, the conventional air purification apparatus has the following problem. In the air purification apparatus, a physical collection operation is primarily essential, and when air is filtered, a large number of contaminants may be collected in a filter (or a configuration which may collect contaminants) in the air purification apparatus. In other words, as the filtering process is performed, there occurs a problem in that the air purification performance of the filter in the air purification apparatus is rapidly decreased by the large number of collected contaminants, and as a result, sufficient air purification for the polluted air may not be performed. Accordingly, since the conventional air purification apparatus requires a process of periodically replacing and cleaning the configuration of collecting contaminants, there occur problems in that inconvenience is given to users and a lot of maintenance costs are required.

Technical Problem

The present invention is directed to providing an air purification apparatus which may perform a cleaning operation for a filter in which contaminants are collected.

The present invention is also directed to providing an air purification apparatus with improved cleaning efficiency for a filter in which contaminants are collected.

The objects of the present invention are not limited to the above-described objects, and the objects not mentioned will be clearly understood by those skilled in the art to which the present invention pertains from the present specification and the accompanying drawings.

Technical Solution

According to one aspect of the present application, there may be provided an air purification apparatus for purifying and discharging purified air including a first flow path which is a movement path of air, a second flow path which is a movement path of the air, and a main pipe including a first filter positioned between the first flow path and the second flow path and configured to collect at least some of contaminants contained in the air, a first main area positioned between the first flow path and the first filter, and a second main area positioned between the second flow path and the first filter, wherein the air purification apparatus may operate in a filtering mode in which at least some of the contaminants contained in the air introduced into the main pipe are collected in the first filter or a cleaning mode in which at least some of the contaminants collected in the first filter in the filtering mode are removed, an operation section of the air purification apparatus in the cleaning mode includes a first section and a second section, the first section and the second section are divided based on a first division time point, and a temperature change rate in the first main area is changed before and after the first division time point.

The configuration of the present invention is not limited to the above-described configurations, and configurations not mentioned will be clearly understood by those skilled in the art to which the present invention pertains from the present specification and the accompanying drawings.

Advantageous Effects

According to the present invention, it is possible to provide an air purification apparatus which can selectively perform a purification operation for introduced air and a cleaning operation for a filter configuration.

In addition, according to the present invention, it is possible to provide an air purification apparatus with improved cleaning efficiency.

The effects of the present invention are not limited to the above-described effects, and effects not mentioned will be clearly understood by those skilled in the art to which the present invention pertains from the present specification and the accompanying drawings.

DESCRIPTION OF DRAWINGS

FIG. 22 is a schematic diagram showing an operation state of an air purification apparatus (5000) according to a second embodiment of the present specification.

FIG. 26 is a schematic diagram of a shared structure of a bypass passage unit of the air purification apparatus (5000) according to the second embodiment of the present specification.

MODES OF THE INVENTION

Figure 1:
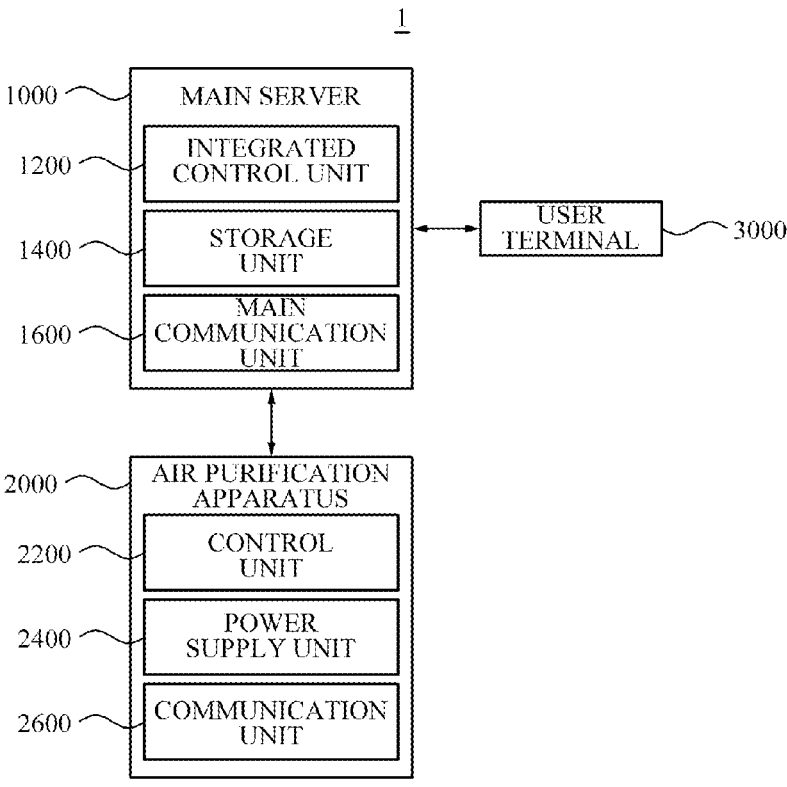
FIG. 1 is a configuration diagram showing an air management system according to a first embodiment of the present specification.

Since the embodiments described in the present specification are to clearly describe the spirit of the present invention to those skilled in the art to which the present invention pertains, the present invention is not limited by the embodiments described in the present specification, and the scope of the present invention should be construed as including modifications or variations which do not depart from the spirit of the present invention.

The terms used in the present specification have been selected as widely used general terms as possible in consideration of the functions in the present invention, but may vary depending on the intention of those skilled in the art to which the present invention pertains, custom, emergence of new technology, or the like. However, on the other hand, when a specific term is defined and used in an arbitrary sense, the meaning of the term will be separately described. Accordingly, the terms used in the present specification should be construed based on the actual meaning of the terms rather than the names of simple terms and the contents throughout the present specification.

The drawings attached to the present specification are to easily describe the present invention, and since the shapes shown in the drawings may be exaggerated as necessary to help understand the present invention, the present invention is not limited by the drawings.

In the present specification, when it is determined that a detailed description of a known configuration or function related to the present invention may obscure the gist of the present invention, a detailed description thereof will be omitted as necessary.

According to one aspect of the present application, there may be provided an air purification apparatus for purifying and discharging polluted air including a first flow path which is a movement path of air, a second flow path which is a movement path of the air, and a main pipe including a first filter which is positioned between the first flow path and the second flow path and which may collect at least some of contaminants contained in the air, a first main area positioned between the first flow path and the first filter, and a second main area positioned between the second flow path and the first filter, wherein the air purification apparatus may operate in a filtering mode in which at least some of the contaminants contained in the air introduced into the main pipe are collected in the first filter or a cleaning mode in which at least some of the contaminants collected in the first filter in the filtering mode are removed, an operation section of the air purification apparatus in the cleaning mode includes a first section and a second section, the first section and the second section are divided with respect to a first division time point, and a temperature change rate in the first main area is changed before and after the first division time point.

The first section may have a first instantaneous temperature increase rate at an entry time point of the first division time point, the second section may have a second instantaneous temperature increase rate at an end time point of the first division time point, and the first instantaneous temperature increase rate may be smaller than the second instantaneous temperature increase rate.

The first section may include a first division adjacent section, the second section may include a second division adjacent section, the first division adjacent section and the second division adjacent section may have the same time range, and an average temperature increase rate of the first main area in the first division adjacent section may be smaller than an average temperature increase rate of the first main area in the second division adjacent section.

The first filter may be coated with a first catalyst which may mediate a reaction to the contaminants, and the first division time point may be after a time point when the reaction based on the first catalyst starts.

When the air purification apparatus operates in the cleaning mode, with respect to the air flow within the main pipe, the second main area may be positioned upstream of the first filter, and the first main area may be positioned downstream of the first filter.

The air introduced from the first flow path may be discharged through the second flow path, and at least some of the contaminants contained in the introduced air may be collected in the first filter as they move from the first main area to the second main area.

The air purification apparatus may further include a control unit configured to control the air purification apparatus to operate in the filtering mode or the cleaning mode, wherein the control unit may determine that the cleaning of the air purification apparatus has been started when the operation section in the cleaning mode of the air purification apparatus includes the first division time point.

The air purification apparatus may further include a control unit configured to control the air purification apparatus to operate in the filtering mode or the cleaning mode, wherein the control unit may determine that the cleaning of the air purification apparatus has been started when a temperature of the second main area is higher than or equal to a predetermined cleaning start temperature.

The first filter may include a first filter area and a second filter area, the first filter area may be closer to the first main area than the second filter area, the second filter area may be closer to the second main area than the first filter area, and a temperature of the first filter area may increase as a heating reaction occurs in the second filter area.

The control unit may determine that the cleaning of the air purification apparatus has been completed when a second time elapses with respect to the time point when it is determined that the cleaning of the air purification apparatus has been started, and the heating of a heating unit may be ended when it is determined that the cleaning of the air purification apparatus has been completed.

The air purification apparatus may further include a control unit configured to control the air purification apparatus to operate in the filtering mode or the cleaning mode, wherein the control unit may determine that the cleaning of the air purification apparatus has been completed when a first time elapses with respect to a time point when the heat-generation of the heating unit starts.

The air purification apparatus may further include a control unit configured to control the air purification apparatus to operate in the filtering mode or the cleaning mode, wherein after it is determined that the cleaning of the air purification apparatus has been started, the control unit may determine that the cleaning of the air purification apparatus has been completed when the temperature of the second main area is lower than or equal to a predetermined cleaning completion temperature.

The air purification apparatus may further include a control unit configured to control the air purification apparatus to operate in the filtering mode or the cleaning mode, wherein the control unit may determine that the cleaning of the air purification apparatus has been started as a temperature of the first main area is higher than the temperature of the second main area and determine that the cleaning of the air purification apparatus has been completed as the temperature of the first main area is lower than the temperature of the second main area.

The air purification apparatus may further include a heating unit which may emit heat so that the air within the air purification apparatus is heated, wherein the first filter may be coated with a first catalyst, the heating unit may emit heat so that the temperature of the second main area is included in a predetermined temperature range—the predetermined temperature range at least includes an activation temperature of the first catalyst—when the air purification apparatus is operating in the cleaning mode.

When it is determined that the cleaning of the air purification apparatus has been started, the control unit may control a heating intensity of the heating unit to decrease.

When it is determined that the cleaning of the air purification apparatus has been completed, the heat-generation of the heating unit is ended.

The air purification apparatus may further include a first opening and closing member positioned between the first flow path and the first main area and a second opening and closing member positioned between the second flow path and the second main area, wherein the first opening and closing member may allow communication or closing between the first flow path and the first main area, the second opening and closing member may allow communication or closing between the second flow path and the second main area, and when a temperature in at least a partial area within the main housing is lower than or equal to a predetermined cooling temperature, the first opening and closing member may allow the first flow path and the first main area to communication with each other, and the second opening and closing member may allow the second flow path and the second main area to communicate with each other.

The air purification apparatus may further include a first opening and closing member positioned between the first flow path and the first main area and a second opening and closing member positioned between the second flow path and the second main area, wherein the first opening and closing member may allow communication or closing between the first flow path and the first main area, the second opening and closing member may allow communication or closing between the second flow path and the second main area, and when the air purification apparatus operates in the cleaning mode, the first opening and closing member may allow at least a part between the first flow path and the first main area to be closed, and the second opening and closing member may allow at least a part between the second flow path and the second main area to be closed.

The air purification apparatus may further include a sub-pipe configured to communicate the second main area and the first main area, wherein the sub-pipe may include a second filter coated with a second catalyst, a first auxiliary area positioned between the second main area and the second filter, and a second auxiliary area positioned between the first main area and the second filter, a temperature of at least a part of the second auxiliary area may be lower than a temperature of at least a part of the first auxiliary area when a temperature of the second catalyst is lower than an activation temperature of the second catalyst, and the temperature of at least a part of the second auxiliary area may be higher than the temperature of at least a part of the first auxiliary area when the temperature of the second catalyst is higher than the activation temperature of the second catalyst.

The reaction based on the first catalyst may be a heating reaction.

The present invention relates to an air purification apparatus for purifying air containing contaminants, and more specifically, to an air purification apparatus which may perform a cleaning operation of removing particles collected in a filter in a process of purifying air containing contaminants.

1. Overview of Air Purification Apparatus

An air purification apparatus refers to an apparatus for removing at least some of contaminants contained in air. The contaminants contained in the air may be classified into particulate matter on the several micrometer scale and nano-scaled gaseous matter on the several Angstrom scale to nano scale according to their sizes. In this case, particulate contaminants are generally known as particulate matter (PM).

The air purification performed by the air purification apparatus according to the embodiments of the present specification is not limited to the specific types of contaminants described above. In other words, contaminants to be described below are not limited to either particulate matter or gaseous matter, and are construed as a generic term for matters which may be collected by a filter included in the air purification apparatus. In addition, polluted air to be described below is construed to refer to air containing the contaminants.

In addition, the air purification as defined in the present specification may mean that contaminants are separated or removed from polluted air provided inside a housing of the air purification apparatus. In other words, the air purification may mean that the contaminants are physically removed from the polluted air (e.g., polluted particles having a diameter greater than a filter transmission diameter smaller than diameters of the polluted particles are caught by the filter or collected by the filter due to electrical attraction to a surface of the filter) or chemically removed (e.g., in the process of passing through the filter, the polluted particles are removed by the chemical reaction, combustion, and the like caused by a sufficient high internal temperature).

Hereinafter, specific embodiments including the configuration and function of the air purification apparatus disclosed by the present application will be described.

2. First Embodiment

Hereinafter, an air management system and an air purification apparatus according to a first embodiment of the present invention will be described with reference to FIGS. 1 to 23.

FIG. 1 is a configuration diagram showing an air management system according to a first embodiment of the present specification.

Referring to FIG. 1, an air management system 1 according to the first embodiment of the present invention may include a main server 1000, an air purification apparatus 2000, and a user terminal 3000.

The main server 1000 may be connected to the air purification apparatus 2000 and the user terminal 3000.

The main server 1000 may control the air purification apparatus 2000.

The main server 1000 may generate data which may control the air purification apparatus 2000. The main server 1000 may transmit data which may control the air purification apparatus 2000 and receive data related to a state of the air purification apparatus 2000. The main server 1000 may update and store information related to the state of the air purification apparatus 2000.

The main server 1000 may exchange data with the user terminal 3000.

The main server 1000 may generate the data which may control the air purification apparatus 2000 based on an input provided from the user terminal 3000. The main server 1000 may transmit the data related to the state of the air purification apparatus 2000 to the user terminal 3000.

The main server may refer to software, program, hardware device or a combination thereof equipped with a computing system which may perform networking such as a web server, a cloud server, and a computing server.

Referring to FIG. 1, the main server 1000 may include an integrated control unit 1200, a storage unit 1400, and a main communication unit 1600.

The integrated control unit 1200 may control a configuration included in the main server 1000. The integrated control unit 1200 may control the storage unit 1400 and the main communication unit 1600.

In this case, the integrated control unit 1200 may be implemented as a CPU or a similar device according to hardware, software, or a combination thereof. In terms of hardware, the integrated control unit 1200 may be provided in the form of an electronic circuit configured to perform a control function by processing an electrical signal. In addition, in terms of software, the integrated control unit 1200 may be provided in the form of a program, application, firmware, or the like processed by the integrated control unit 1200 which is hardware.

The storage unit 1400 may store data provided from the air purification apparatus 2000 and data provided from the user terminal 3000.

State information on the air purification apparatus 2000 may be stored in the storage unit 1400.

In this case, the data provided from the air purification apparatus 2000 may include temperature data, pressure data, particulate matter measurement data, power consumption data, data on whether a filter is abnormal, data on an operating time of the filter, and data on whether an emergency situation occurs of each air purification apparatus.

The data for controlling the air purification apparatus 2000 may be stored in the storage unit 1400. For example, cleaning start information and cleaning end information on the air purification apparatus 2000 may be stored in the storage unit 1400.

The storage unit 1400 may refer to a hard disk drive (HDD), a memory card, an optical disc, a flash memory, or other storage devices.

The main communication unit 1600 may communicate with the air purification apparatus 2000 and the user terminal 3000. The main communication unit 1600 may communicate with the air purification apparatus 2000 and the user terminal 3000 wirelessly or by wire.

The main communication unit 1600 may transmit the changed state information on the air purification apparatus 2000 to the user terminal 3000.

In this case, whether the state information on the air purification apparatus 2000 is changed may be determined by the integrated control unit 1200.

The main communication unit 1600 may transmit a signal for controlling the operation of the air purification apparatus 2000 to the air purification apparatus 2000.

In this case, the signal for controlling the operation may be based on the data provided from the user terminal 3000 or may be acquired by the integrated control unit 1200.

The main communication unit 1600 may refer to a configuration which may perform a data communication function, such as a local area network (LAN), Wi-Fi, Bluetooth, a long-term evolution (LTE) communication network, or a fifth generation (5G) communication network.

The air purification apparatus 2000 may purify air.

Referring to FIG. 1, the air purification apparatus 2000 may include a control unit 2200, a power supply unit 2400, and a communication unit 2600.

The control unit 2200 may control individual components of the air purification apparatus 2000 based on the control data received from the main server 1000.

Alternatively, the control unit 2200 may control the individual components of the air purification apparatus 2000 according to a predetermined standard.

Alternatively, the control unit 2200 may control the individual components of the air purification apparatus 2000 based on an input provided by a user.

The control unit 2200 may be implemented as a CPU or a similar device according to hardware, software, or a combination thereof. In terms of hardware, the control unit 2200 may be provided in the form of an electronic circuit configured to perform a control function by processing an electrical signal. In addition, in terms of software, the control unit 2200 may be provided in the form of a program, application, firmware, or the like processed by the control unit 2200 which is hardware.

An electrical signal for performing an operation of a component of the air purification apparatus 2000 to be performed below may be construed as being acquired by the control unit 2200 unless otherwise specified.

In addition, information on the input provided by a manager or a user of the air purification apparatus 2000 may be construed as being provided to the control unit 2200 unless otherwise specified.

The power supply unit 2400 may apply power to the individual components of the air purification apparatus 2000.

In addition, the power supply unit 2400 may cut off the power provided to the individual components or adjust the amount of power supplied.

In this case, the power supply unit 2400 may cut off the power applied to the individual components or control the amount of power supplied based on a control signal provided from the control unit 2200.

Alternatively, even when a separate control signal is not provided from the control unit 2200, the power supply unit 2400 may cut off power applied to a specific component of the air purification apparatus 2000.

The communication unit 2600 may communicate with the main server 1000.

The communication unit 2600 may transmit data on the air purification apparatus 2000 to the main communication unit 1600. According to one example, the communication unit 2600 may provide state information on the air purification apparatus 2000. The communication unit 2600 may output visual information or auditory information related to the state information.

In addition, the communication unit may receive an operation signal for the air purification apparatus 2000 from the main communication unit 1600.

Like the main communication unit 1600, the communication unit 2600 may be implemented as various methods such as a local area network (LAN), Wi-Fi, Bluetooth, a long-term evolution (LTE) communication network, and a fifth generation (5G) communication network.

The user terminal 3000 may transmit or receive data on the air purification apparatus 2000 with the main server 1000.

The user terminal 3000 may acquire the state information on the air purification apparatus 2000 from the main communication unit 1600.

The user terminal 3000 may receive an input related to the control of the air purification apparatus 2000 from the user so that the main server 1000 may output the control signal for the air purification apparatus 2000.

The user terminal 3000 may be any electronic device equipped with a wireless communication function, such as smart phones, notebook computers, tablet PCs, desktop computers, and portable media players.

Although not shown in the drawings, the user terminal 3000 may directly control the air purification apparatus 2000. In this case, the user terminal 3000 may exchange data with the air purification apparatus 2000 through the communication unit 2600 of the air purification apparatus 2000. Data on the state change of the air purification apparatus 2000 may also be directly transmitted to the user terminal 3000, and data on the state change of the air purification apparatus 2000 may be transmitted to and managed by the main server 1000.

Hereinafter, the configuration and function of the air purification apparatus 2000 will be described in detail.

2-1 Configuration and Function of Air Purification Apparatus

Figure 2:
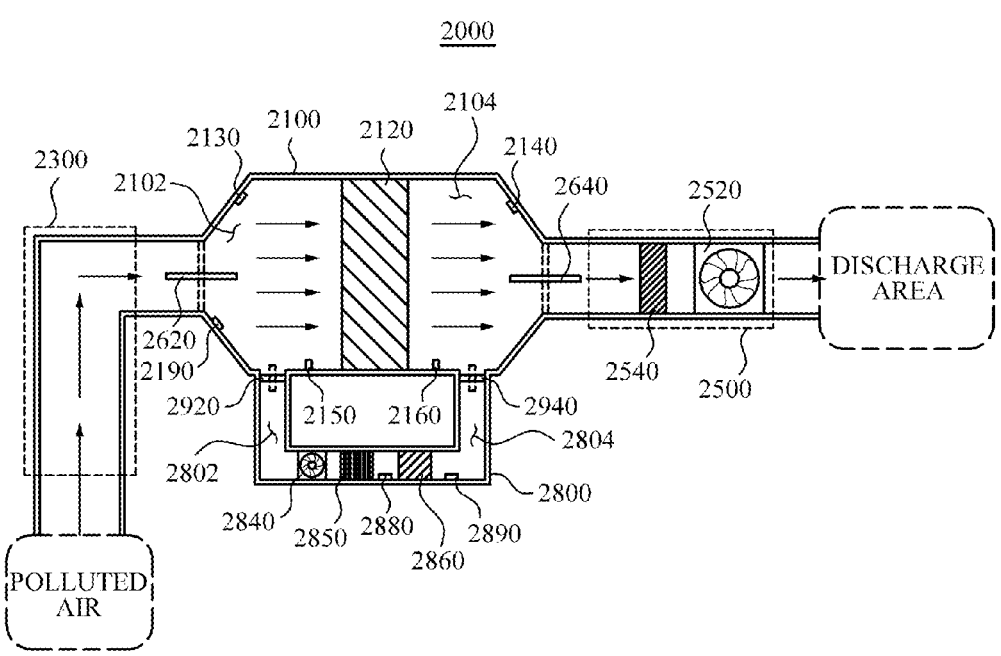
FIG. 2 is a schematic diagram showing an air purification apparatus according to the first embodiment of the present specification.

FIG. 2 is a schematic diagram showing the air purification apparatus according to the first embodiment of the present specification.

Referring to FIG. 2, the air purification apparatus 2000 according to the first embodiment may include an inlet 2300, an outlet 2500, a main housing 2100, and a sub-housing 2800.

The main housing 2100 may be positioned between the inlet 2300 and the outlet 2500.

The sub-housing 2800 may communicate with at least a part of the main housing 2100. The sub-housing 2800 may be fluidically connected by communicating with two points of the main housing 2100.

A housing as defined in the present specification may be referred to as a pipe or a tube.

Air provided through the inlet 2300 may flow inside the sub-housing 2800 through a point communicating with the main housing 2100.

In the main housing 2100, polluted air may be purified.

The main housing 2100 may represent an external appearance of an air purification structure.

The main housing 2100 may have an inclined surface in an area adjacent to the inlet 2300. The main housing 2100 may have an inclined surface in an area adjacent to the outlet 2500.

According to one example, a cross section of the main housing 2100 in a predetermined direction, wherein the predetermined vertical direction is defined as a direction perpendicular to a direction from the inlet 2300 to the outlet 2500, may have a predetermined shape. The predetermined shape may be a rectangle or a circle. The inclined surface of the adjacent area may include a first point and a second point closer to the inlet 2300 than the first point. The cross section in the predetermined direction at the first point may have a first area, and the cross section in the predetermined direction at the second point may have a second area. In this case, the first area may be greater than the second area.

Referring to FIG. 2, the main housing 2100 may include a first filter unit 2120, a first temperature detection unit 2130, a second temperature detection unit 2140, a first pressure detection unit 2150, a second pressure detection unit 2160, and an emergency temperature detection unit 2190.

The first filter unit 2120 may be positioned in the main housing 2100 to collect contaminants contained in the air.

The first filter unit 2120 may be positioned between a first opening and closing member 2620 and a second opening and closing member 2640.

A flow path through which at least air may pass may be provided in the first filter unit 2120.

The first filter unit 2120 refers to a configuration including a filter which may collect contaminants regardless of specific physical or chemical characteristics such as material, size, shape, and heat resistance temperature. The first filter unit 2120 is not limited to a specific material or a specific substance. According to one example, the first filter unit 2120 may be at least one of a ceramic filter and a metal filter.

In particular, a filter structure for collecting contaminants needs to sufficiently secure its surface area. To this end, the first filter unit 2120 may include a filter having a porous structure. Alternatively, the first filter unit 2120 may have a filter structure of a ceramic honeycomb structure.

According to one example, the first filter unit 2120 may include a first ceramic flow path and a second ceramic flow path. In this case, the first ceramic flow path may have an air flow path in a first filter direction from the inlet 2300 toward the outlet 2500 and an end surface on one surface of the first filter unit 2120 adjacent to the inlet 2300, and the second ceramic flow path may have an air flow path along a second filter direction opposite to the first filter direction and an end surface on the other surface of the first filter unit 2120 adjacent to the outlet 2500. The air provided to the first filter unit 2120 may be moved along the first ceramic flow path, and at least a part of the provided air may be moved along the second ceramic flow path. When at least a part of the provided air moves from the first ceramic flow path to the second ceramic flow path, at least some of the contaminants contained in the at least part of the provided air may be collected on a ceramic inner surface, wherein the ceramic inner surface is a surface positioned between the first ceramic flow path and the second ceramic flow path. Here, although it has been described that the first filter unit 2120 includes the first ceramic flow path and the second ceramic flow path, the first filter unit 2120 may include a plurality of first ceramic flow paths and a plurality of second ceramic flow paths. The plurality of first ceramic flow paths and the plurality of second ceramic flow paths may be alternately disposed to collect the contaminants in the air passing through the first filter unit 2120.

When the first filter unit 2120 sufficiently collects the contaminants, the contaminants collected in the first filter unit 2120 need to be removed.

In order to remove the contaminants accumulated in the first filter unit 2120, the first filter unit 2120 may be cleaned by allowing a reaction to the accumulated contaminants to occur.

According to one example, the first filter unit 2120 may be provided with a first catalyst for mediating a first reaction.

In this case, when the temperature of the first filter unit 2120 is higher than or equal to a predetermined temperature, a reaction based on the first catalyst may occur in the contaminants collected in the first filter unit 2120.

In this case, the first reaction may be a heating reaction. Accordingly, the first filter unit 2120 may function as a heat source.

The first temperature detection unit 2130 may be positioned between the first opening and closing member 2620 and the first filter unit 2120. The first temperature detection unit 2130 may be arranged on a partial surface of the main housing 2100.

Alternatively, an area where the first temperature detection unit 2130 may be installed may be provided in the main housing 2100 in advance. In this case, when information on the temperature of the first main area 2102 needs to be acquired, the first temperature detection unit 2130 may be installed from the outside. Hereinafter, the first main area 2102 may refer to an area between the first opening and closing member 2620 and the first filter unit 2120.

The first temperature detection unit 2130 may be connected to the control unit 2200.

The first temperature detection unit 2130 may acquire information on the temperature of at least a partial area of the first main area 2102. In addition, the first temperature detection unit 2130 may transmit the acquired information on the temperature of the first main area 2102 to the control unit 2200.

The second temperature detection unit 2140 may be positioned between the second opening and closing member 2640 and the first filter unit 2120. The second temperature detection unit 2140 may be arranged on a partial surface of the main housing 2100.

Alternatively, an area where the second temperature detection unit 2140 may be installed may be provided in the main housing 2100 in advance. In this case, when information on the temperature of the second main area 2104 needs to be acquired, the second temperature detection unit 2140 may be installed from the outside. Hereinafter, the second main area 2104 may refer to an area between the second opening and closing member and the first filter unit.

The second temperature detection unit 2140 may be connected to the control unit 2200.

The second temperature detection unit 2140 may acquire information on the temperature of the at least a partial area of the second main area 2104. In addition, the second temperature detection unit 2140 may transmit the acquired information on the temperature of the second main area 2104 to the control unit 2200.

The emergency temperature detection unit 2190 may be positioned in the main housing 2100.

According to one example, the emergency temperature detection unit 2190 may be positioned in the first main area 2102. Alternatively, the emergency temperature detection unit 2190 may be arranged in a downstream area with respect to the first filter unit 2120 when a circulation air flow is generated between the main housing 2100 and the sub-housing 2800.

Alternatively, the emergency temperature detection unit 2190 may be positioned on the inclined surface of the main housing 2100 adjacent to the inlet 2300.

Although not shown in the drawings, the emergency temperature detection unit 2190 may be positioned in the sub-housing 2800.

According to one example, the emergency temperature detection unit 2190 may be positioned in a downstream area with respect to a second filter unit 2860 when a circulation air flow is generated between the main housing 2100 and the sub-housing 2800. Alternatively, the emergency temperature detection unit 2190 may be positioned in a downstream area with respect to a heating unit 2850.

The emergency temperature detection unit 2190 may be connected to the control unit 2200. The emergency temperature detection unit 2190 may provide information on a temperature at a position of the emergency temperature detection unit 2190 to the control unit 2200.

The control unit 2200 may acquire information on the operation of the air purification apparatus 2000 based on the temperature information provided from at least any one of the first temperature detection unit 2130, the second temperature detection unit 2140, and the emergency temperature detection unit 2190.

The first temperature detection unit 2130, the second temperature detection unit 2140, and the emergency temperature detection unit 2190 are not essential configurations, and at least any one of the first temperature detection unit 2130, the second temperature detection unit 2140, and the emergency temperature detection unit 2190 may be removed.

The first pressure detection unit 2150 may be positioned in the first main area 2102.

According to one example, the first pressure detection unit 2150 may be positioned on a non-inclined surface of the main housing 2100. For example, a cross-sectional area in a predetermined vertical direction at a third point of the main housing 2100, wherein the third point is defined by a position where the first pressure detection unit 2150 is disposed, may have a third area. A cross-sectional area in the predetermined vertical direction at a fourth point of the main housing 2100, wherein the fourth point may refer to any partial point in the area of the main housing 2100 in which the first filter unit 2120 is positioned, may have a fourth area. In this case, the third area and the fourth area may be the same.

The first pressure detection unit 2150 is positioned at a position corresponding to the third point, so that it is possible to prevent the rotation of air turbulence which may occur when air flows in an area before and after the first filter unit 2120.

Although not shown in the drawings, the main housing 2100 may include a first coupling unit to which the first pressure detection unit 2150 may be coupled. The first coupling unit may be positioned at at least any position of the main housing 2100 corresponding to the first main area 2102.

The first pressure detection unit 2150 may acquire information on the pressure of at least a part of the first main area 2102.

The first pressure detection unit 2150 may be connected to the control unit 2200. In this case, the first pressure detection unit 2150 may transmit information on the pressure of at least a partial area of the first main area 2102 to the control unit 2200 in real time or as necessary.

The second pressure detection unit 2160 may be positioned in the second main area 2104.

According to one example, the second pressure detection unit 2160 may be positioned on the non-inclined surface of the main housing 2100. For example, a cross-sectional area in the predetermined vertical direction at a fifth point—the fifth point is defined by a position at which the second pressure detection unit 2160 is arranged—of the main housing 2100 may have a fifth area. In this case, the fifth area and the fourth area may be the same.

The second pressure detection unit 2160 is positioned at a position corresponding to the fifth point, so that it is possible to prevent the rotation of air turbulence which may occur when air flows in the area before and after the first filter unit 2120.

Although not shown in the drawings, the main housing 2100 may include a second coupling unit to which the second pressure detection unit 2160 may be coupled. The second coupling unit may be positioned at at least any position of the main housing 2100 corresponding to the second main area 2104.

The second pressure detection unit 2160 may acquire information on the pressure of at least a part of the second main area 2104.

The second pressure detection unit 2160 may be connected to the control unit 2200. In this case, the second pressure detection unit 2160 may transmit the information on the pressure of at least a partial area of the second main area 2104 to the control unit 2200 in real time or as necessary.

The control unit 2200 may acquire filter abnormality information on the air purification apparatus 2000 based on the pressure information provided from the first pressure detection unit 2150 and the pressure information provided from the second pressure detection unit 2160.

The air flowing through the inlet 2300 may be relatively polluted air. The inlet 2300 may be fluidically connected to an indoor or outdoor area to which the polluted air is provided. The air flowing through the inlet 2300 may be relatively polluted air compared to the air flowing through the outlet 2500.

The air flowing through the outlet 2500 may be relatively purified air. The outlet 2500 may be fluidically connected to a discharge area through which the purified air is discharged. The air flowing through the outlet 2500 may be relatively purified air compared to the air flowing through the inlet 2300.

Referring to FIG. 2, the outlet 2500 may include an exhaust unit 2520 and an adsorption unit 2540.

The exhaust unit 2520 may discharge the purified air to a discharge area. The exhaust unit 2520 may generate an air flow from the inlet 2300 toward the outlet 2500 so that the purified air is discharged to the outside.

The exhaust unit 2520 may be controlled by the control unit 2200.

In this case, when the indoor polluted air is discharged to the outside, the discharge area may be an outside area, or when the outdoor polluted air is purified and supplied to the indoor, the discharge area may be an indoor area.

The adsorption unit 2540 may be positioned on the outlet 2500.

The adsorption unit 2540 may adsorb particulate matter. In this case, when the particulate matter is contained in the air, the odor may be generated.

When the adsorption unit 2540 is heated to a predetermined temperature or higher, the adsorption unit 2540 may be cleaned. For example, when the air heated from the main housing 2100 is provided to the adsorption unit 2540, the particulate matter contained in the adsorption unit 2540 may be removed.

Referring to FIG. 2, the air purification apparatus 2000 may further include the first opening and closing member 2620 and the second opening and closing member 2640.

The opening and closing member as defined in the present specification refers to a configuration which may selectively perform a function of changing the state of the flow path to an opened state or a closed state. In other words, the opening and closing member is not limited to a specific shape or a fixed position, and according to one example, may be a damper or a one-way valve.

The opening and closing member shown in the present specification is shown by a solid line or a dotted line. In this case, when the air purification apparatus 2000 is operating in the operation mode in each drawing, the operation state of the opening and closing member is shown by a solid line.

The opening and closing member defined in the present specification may be construed as being controlled by the control unit 2200 unless otherwise specified.

When the opening and closing member defined in the present specification is opened, it may mean that adjacent areas are fluidically connected to each other. In addition, when the opening and closing member is closed, it may mean that adjacent areas are prevented from being fluidically connected to each other.

The first opening and closing member 2620 may be positioned between the inlet 2300 and the main housing 2100. The first opening and closing member 2620 may be positioned between the inlet 2300 and the first main area 2102.

The first opening and closing member 2620 may adjust a flow rate of air. Specifically, the first opening and closing member 2620 may increase or decrease the amount of air flow provided from the inlet 2300 to the first main area 2102.

The second opening and closing member 2640 may be positioned between the main housing 2100 and the outlet 2500. The second opening and closing member 2640 may be positioned between the second main area 2104 and the outlet 2500.

The second opening and closing member 2640 may adjust a flow rate of air. Specifically, the second opening and closing member 2640 may increase or decrease the amount of air flow provided from the second main area 2104 to the outlet 2500.

In the sub-housing 2800, a flow path through which an air circulation flow may be generated may be provided.

Specifically, in the sub-housing 2800, when the air purification apparatus 2000 performs the filtering operation, the air circulation flow can be minimized, and when the air purification apparatus 2000 performs the cleaning operation, the air circulation flow may be generated.

The sub-housing 2800 may include a first circulation flow path unit 2802, a second circulation flow path unit 2804, a third opening and closing member 2920, a fourth opening and closing member 2940, a circulation induction unit 2840, a heating unit 2850, a second filter unit 2860, a third temperature detection unit 2880, and a fourth temperature detection unit 2890.

According to one example, with respect to the direction from the inlet 2300 to the outlet 2500, the circulation induction unit 2840, the heating unit 2880, and the second filter unit 2860 may be positioned in an order, but the arrangement order is not limited to the order shown in FIG. 2.

The first circulation flow path unit 2802 and the second circulation flow path unit 2804 are at least a part of the flow path defined by the sub-housing 2800. The first circulation flow path unit 2802 may be fluidically connected to the main housing 2100. According to one example, the first circulation flow path unit 2802 may communicate with the first main area 2102.

The second circulation flow path unit 2804 may be fluidically connected to the main housing 2100. According to one example, the second circulation flow path unit 2804 may communicate with the second main area 2104.

The circulation induction unit 2840 may be positioned between the first circulation flow path unit 2802 and the second circulation flow path unit 2804 with respect to the air flow path of the sub-housing 2800.

The circulation induction unit 2840 may be connected to the control unit 2200 and the power supply unit 2400.

The circulation induction unit 2840 may induce an air flow in the sub-housing 2800. The circulation induction unit 2804 may generate an air flow in a direction from the inlet 2300 toward the outlet 2500 or in a direction from the outlet 2500 toward the inlet 2300. The circulation induction unit 2840 may generate a circulation flow in areas within the main housing 2100 and the sub-housing 2800.

The circulation induction unit 2840 may be controlled by the control unit 2200.

The circulation air flow including the circulation flow as defined in the present specification may be construed as being generated by the circulation induction unit 2840 unless otherwise specified.

The heating unit 2850 may be positioned between the first circulation flow path unit 2802 and the second circulation flow path unit 2804 with respect to the air flow path of the sub-housing 2800.

The heating unit 2850 may emit heat. The heating unit 2850 may heat the first filter unit 2120 and the second filter unit 2860. The heating unit 2850 may be implemented in various methods including an electric heater including an electric heating wire, a microwave method, and the like.

The heating unit 2850 may be controlled by the control unit 2200.

As described above, the first filter unit 2120 needs to be heated so that a reaction to the contaminants collected in the first filter unit 2120 occurs. The heating unit 2850 may increase the temperature of the first filter unit 2120 so that the first filter unit 2120 may be cleaned.

According to one example, the heating unit 2850 may heat the air in the main housing 2520 and the sub-housing 2800. In particular, the air heated by the heating unit 2850 may be diffused into the main housing 2100 and the sub-housing 2800 by the circulation induction unit 2840. The air heated by the heating unit 2850 may be provided to the second main area 2104 through the second circulation flow path unit 2804.

Although not shown in the drawings, the heating unit 2850 may be arranged in the main housing 2100. In this case, the heating unit 2850 may be positioned in the first main area 2102 or the second main area 2104.

The second filter unit 2860 may be positioned between the first circulation flow path unit 2802 and the second circulation flow path unit 2804 with respect to the air flow path in the sub-housing.

According to one example, the second filter unit 2860 may be positioned in a downstream area of the heating unit 2850 with respect to the air flow induced by the circulation induction unit 2840. In this case, the temperature of the second filter unit 2860 may be increased more efficiently (compared to a case where the second filter unit 2860 is arranged at a position other than the downstream area) by the heating unit 2850.

A second reaction may occur in the second filter unit 2860. A second catalyst which may mediate the second reaction may be provided in the second filter unit.

According to one example, like the first filter unit 2120, the second filter unit 2860 may be at least any one of a ceramic filter and a metal filter and coated with the second catalyst.

In this case, when the temperature of the second filter unit 2860 is higher than or equal to a predetermined temperature, a reaction based on the second catalyst may occur in the contaminants collected in the second filter unit 2860.

The second reaction may be a heating reaction. The heat generated by the second reaction may be diffused in the air flow direction defined by the circulation induction unit 2840.

The third temperature detection unit 2880 may be positioned in a downstream area of the heating unit 2850 with respect to the circulation flow within the sub-housing 2800. According to one example, the third temperature detection unit 2880 may be positioned between the heating unit 2850 and the second filter unit 2860.

The third temperature detection unit 2880 may be connected to the control unit 2200.

The third temperature detection unit 2880 may acquire information on a temperature of an area where the third temperature detection unit 2880 is positioned and transmit the acquired information on the temperature to the control unit 2200.

The fourth temperature detection unit 2890 may be positioned in a downstream area of the second filter unit 2860 with respect to the circulation flow within the sub-housing 2800. According to one example, the fourth temperature detection unit 2890 may be positioned between the second filter unit 2860 and the second circulation flow path 2804 with respect to the air flow path of the sub-housing 2800.

The fourth temperature detection unit 2890 may be connected to the control unit 2200.

The fourth temperature detection unit 2890 may acquire information on a temperature of an area where the fourth temperature detection unit 2890 is positioned and transmit the acquired information on the temperature to the control unit 2200.

The third opening and closing member 2920 may be arranged between the first main area 2102 and the first circulation flow path unit 2802.

The fourth opening and closing member 2940 may be arranged between the second main area 2104 and the second circulation flow path unit 2804.

The third opening and closing member 2920 and the fourth opening and closing member 2940 may adjust the flow rate of air. Specifically, the third opening and closing member 2920 and the fourth opening and closing member 2940 may increase or decrease the amount of air flow which may be moved between the main housing 2100 and the sub-housing 2800.

In this case, the sub-housing 2800 may not include any one of the third opening and closing member 2920 and the fourth opening and closing member 2940. In other words, when at least any one of the third opening and closing member 2920 and the fourth opening and closing member 2940 is included, it is possible to achieve the purpose of inducing air flow in the sub-housing 2800 or minimizing the air flow.

Preferably, only the fourth opening and closing member 2940 may be included in the sub-housing 2800. When the exhaust unit 2520 induces an air flow from the inlet 2300 to the outlet 2500 (among the third opening and closing member and the fourth opening and closing member), the air flow within the sub-housing 2800 needs to be minimized. In this case, when only the third opening and closing member 2920 is included, at least a small amount of air flow may be generated in a partial area in the sub-housing 2800 including the second circulation flow path unit 2804, and thus the efficiency of the air flow in the main housing 2100 may be decreased. On the contrary, when only the fourth opening and closing member 2940 is included, the air flow that may be generated in the second circulation flow path unit 2804 can be blocked, and the above-described problem can be prevented.

Hereinafter, a case in which only the fourth opening and closing member 2940 is included is described as an example, but according to an exemplary embodiment, a case in which only the third opening and closing member 2920 is included should be construed as also including the embodiment of the case in which both the third opening and closing member 2920 and the fourth opening and closing member 2940 are included.

Hereinafter, detailed contents related to the operation of the air purification apparatus according to the first embodiment of the present specification will be described.

2-2 Operation Mode of Air Purification Apparatus 2-2-1 Overview

Figure 3:
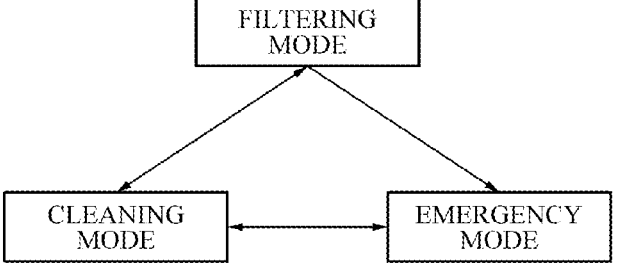
FIG. 3 is a configuration diagram showing an operation mode of the air purification apparatus according to the first embodiment of the present specification.

The air purification apparatus according to the first embodiment of the present specification may operate in a plurality of operation modes. FIG. 3 is a configuration diagram showing an operation mode of the air purification apparatus according to the first embodiment of the present specification.

Referring to FIG. 3, the operation mode of the air purification apparatus 2000 according to the first embodiment of the present specification may include a filtering mode, a cleaning mode, and an emergency mode. The air purifier may operate in the filtering mode, the cleaning mode, or the emergency mode.

In the filtering mode, the air purification apparatus 2000 may purify polluted air. In the cleaning mode, the first filter unit 2120 may be cleaned. In the emergency mode, when an emergency situation occurs, the air purification apparatus 2000 may perform a response operation for the emergency situation.

Hereinafter, each of the operation modes of the air purification apparatus will be described in detail. However, overlapping contents among the above-described contents of the individual components of the air purification apparatus may be omitted, and the contents of the operation modes will be construed with reference to the above-described configurations and functions of the air purification apparatus.

2-2-2 Filtering Mode

Figure 4:
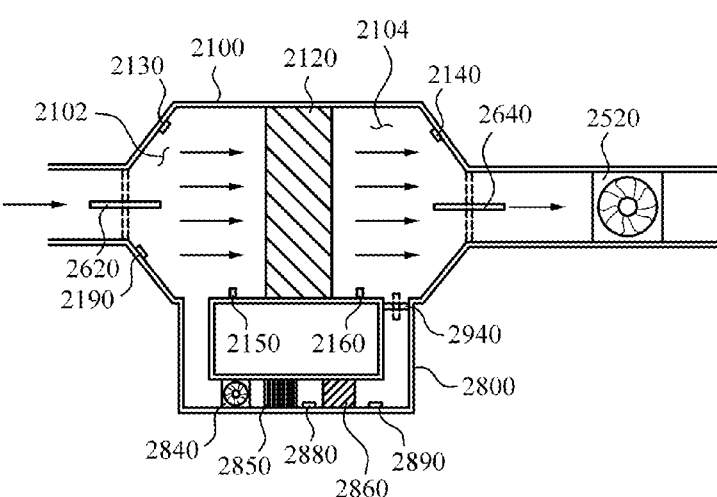
FIG. 4 is a schematic diagram of the air purification apparatus according to the first embodiment of the present specification, and a schematic diagram of the air purification apparatus operating in a filtering mode.

FIG. 4 is a schematic diagram of the air purification apparatus according to the first embodiment of the present specification, and a schematic diagram of the air purification apparatus operating in the filtering mode.

Referring to FIG. 4, the air purification apparatus 2000 operating in the filtering mode may perform a filtering operation of purifying polluted air. When the air purification apparatus 2000 operates in the filtering mode, contaminants may be collected in the first filter unit 2120.

The air purification apparatus 2000 may enter the filtering mode according to a predetermined filtering entry criterion. The predetermined filtering entry criterion may be based on an input signal of a manager of the air purification apparatus 2000 or state information on the air purification apparatus 2000.

When the air purification apparatus 2000 enters the filtering mode, individual components of the air purification apparatus 2000 may perform a predetermined filtering mode operation. The control unit 2200 may output a signal for controlling the predetermined filtering mode operation of the individual components of the air purification apparatus 2000.

At this time, the first opening and closing member 2620 and the second opening and closing member 2640 may be opened.

At this time, the exhaust unit 2520 may induce an air flow from the first main area 2102 to the second main area 2104.

At this time, the fourth opening and closing member 2940 may be closed. Accordingly, in the sub-housing 2800, the air flow generated by the exhaust unit 2520 can be minimized.

At this time, the circulation induction unit 2840 may not operate. At this time, the heating unit 2850 may not emit heat.

The relatively polluted air provided to the main housing 2100 may be purified by the first filter unit 2120.

At least a part of the contaminants contained in the air introduced into the main housing 2100 may be collected in the first filter unit 2120 as it passes through the first filter unit 2120.

At least a part of the contaminants contained in the air introduced into the main housing 2100 may be collected in the first filter unit 2120 as it moves in a direction from the first main area 2102 toward the second main area 2104.

As described above, the flow path through which air may at least flow may be provided in the first filter unit 2120, but as the contaminants are accumulated in the first filter unit 2120, at least a part of the provided flow path may be blocked.

As the amount of contaminants collected in the first filter unit 2120 increases, the amount of air flow passing through the first filter unit 2120 may decrease. As the amount of contaminants collected by the first filter unit 2120 performing the filtering operation increases, a difference between a flow rate generated in the inlet 2300 and a flow rate flowing through the outlet 2500 may increase.

When the filtering operation of the air purification apparatus 2000 is performed, a pressure difference between the areas before and after the first filter unit 2120 may be changed. A pressure of the first main area 2102 may be higher than a pressure of the second main area 2104. A difference between the pressure of the first main area 2102 and the pressure of the second main area 2104 may increase as air purification proceeds (i.e., as the filtering operation is performed).

The control unit 2200 may determine whether the first filter of the air purification apparatus 2000 is in an abnormal state.

When it is determined that the air purification apparatus 2000 is in the state in which the first filter is abnormal, the control unit 2200 may acquire (or output) first filter abnormality information.

The control unit 2200 may determine whether the first filter of the air purification apparatus 2000 is in the abnormal state based on any one of the pressure information on the first main area 2102 and the pressure information on the second main area 2104.

Alternatively, the control unit 2200 may determine whether the first filter of the air purification apparatus 2000 is in the abnormal state based on the pressure information on the first main area 2102 and the pressure information on the second main area 2104.

The control unit 2200 may determine whether the first filter of the air purification apparatus 2000 is in the abnormal state based on the flow rate information on the first main area 2102 and the flow rate information on the second main area 2104.

The first filter abnormality information may include information on a decrease in the operation performance of the air purification apparatus 2000.

The first filter abnormality information may include information on the necessity for the cleaning operation of the air purification apparatus 2000.

The first filter abnormality information may include information on the collection of an excessive amount of contaminants in the first filter unit 2120.

When the control unit 2200 determines that the first filter of the air purification apparatus 2000 is in the abnormal state, the communication unit 2600 may transmit the state information on the air purification apparatus 2000 based on the first filter abnormality information, to the main server 1000 or the user terminal 3000.

Even when the air purification apparatus 2000 is operating in the filtering mode, at least any one of the first temperature detection unit 2150, the second temperature detection unit 2160, the third temperature detection unit 2880, the fourth temperature detection unit 2890, and the emergency temperature detection unit 2190 may provide the information on the temperature of the air purification apparatus 2000 to the control unit 2200.

The air purification apparatus 2000 operating in the filtering mode may enter the cleaning mode according to a predetermined cleaning entry criterion. The cleaning entry criterion may be based on the input signal of the manager of the air purification apparatus 2000 or the state information on the air purification apparatus 2000, or may relate to a predetermined time reference.

2-2-3 Cleaning Mode 2-2-3-1 General

Hereinafter, the cleaning mode of the air purification apparatus 2000 will be described with reference to FIGS. 5 to 12.

Figure 5:
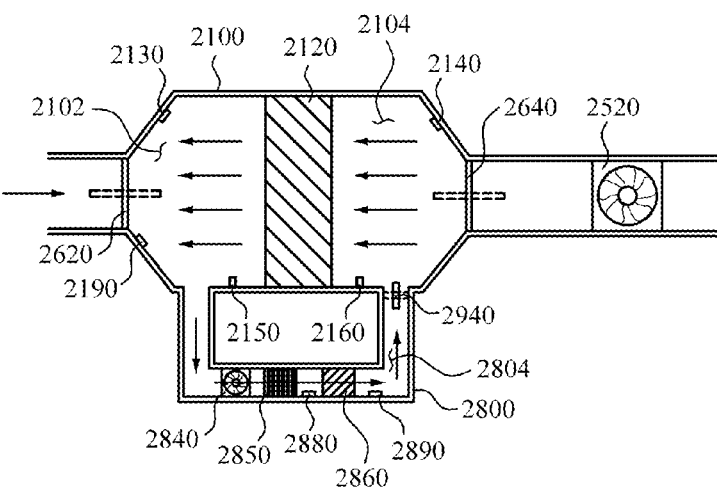
FIG. 5 is a schematic diagram of the air purification apparatus according to the first embodiment of the present specification, and a schematic diagram of the air purification apparatus operating in a cleaning mode.

FIG. 5 is a schematic diagram of the air purification apparatus according to the first embodiment of the present specification, and a schematic diagram of the air purification apparatus operating in the cleaning mode.

Referring to FIG. 5, the air purification apparatus 2000 operating in the cleaning mode may perform the cleaning operation so that the first filter unit 2120 is cleaned. When the air purification apparatus 2000 operates in the cleaning mode, at least some of the contaminants collected in the first filter unit 2120 may be removed.

When the air purification apparatus 2000 enters the cleaning mode, the individual components of the air purification apparatus 2000 may perform a predetermined cleaning mode operation. The control unit 2200 may output a signal for controlling the predetermined cleaning mode operation for the individual components of the air purification apparatus 2000.

At this time, the first opening and closing member 2620 and the second opening and closing member 2640 may be closed.

The first opening and closing member 2620 closes the air flow path provided to the main housing 2100, but may not be in a completely sealed state. Accordingly, even when the first opening and closing member 2620 is in the closed state, at least a small amount of air (i.e., air containing at least a small amount of oxygen) may be introduced into the main housing 2100.

At this time, the exhaust unit 2520 may not operate.

At this time, the fourth opening and closing member 2940 may be opened. Accordingly, the second main area 2104 may be fluidically connected to the second circulation flow path unit 2804.

At this time, the circulation induction unit 2840 may induce an air flow. Due to the operation of the circulation induction unit 2840, a circulation flow may be generated within the main housing 2100 and the sub-housing 2800.

The direction of the above-described circulation flow may be defined by the circulation induction unit 2840. The arrows shown in FIG. 5 indicate the direction of the circulation air flow. Although FIG. 5 shows the air flow circulated counterclockwise, the present invention is not limited thereto, and the air may be circulated clockwise according to an embodiment. Hereinafter, the content related to the cleaning mode will be described based on the air flow circulated counterclockwise, but the present invention is not construed as being limited thereto.

In this case, the heating unit 2850 may emit heat. The air heated by the heating unit 2850 may be diffused by the above-described circulation flow, and the first filter unit 2120 may be heated. The heating intensity of the heating unit 2850 may be controlled according to a predetermined criterion.

When the first filter unit 2120 is heated by the heating unit 2850, at least some of the contaminants collected in the first filter unit 2120 may be removed.

According to one example, as described above with reference to FIG. 2, a reaction to the collected contaminants based on the first catalyst may occur. When the temperature of the first filter unit 2120 is higher than or equal to a predetermined temperature, a reaction to the collected contaminants may occur. When the temperature of the first catalyst is higher than or equal to a specific temperature— the specific temperature corresponds to the activation temperature of the first catalyst—, the reaction to the contaminants may proceed.

According to one example, the first catalyst may be a catalyst for mediating a cracking reaction to the contaminants collected in the first filter unit 2120. In this case, when the reaction based on the first catalyst proceeds, the contaminants may be decomposed into a material having a smaller molecular size than before the reaction.

The temperature of the first filter unit 2120 may be indirectly increased by the heated air whose temperature is increased by the heating unit 2850. Accordingly, it may take a long time for the temperature of the first filter unit 2120 to be sufficiently high (higher than or equal to a temperature at which the contaminants may at least react) with only the heating unit 2850.

According to one embodiment, a partial area of the first filter unit 2120 may be heated by the heating reaction occurring in the remaining part of the first filter unit 2120.

Specifically, a first surface of the first filter unit 2120, wherein the first surface refers to one surface of the first filter unit relatively adjacent to the heating unit 2850 with respect to the circulation flow direction and path, may be heated earlier than a second surface opposite to the first surface.

A temperature of an area closer to the first surface of the first filter unit 2120 may be first increased with respect to the first surface and the second surface.

At this time, the reaction based on the first catalyst may occur first in the area (which may refer to an area closer to the first surface than the second surface) heated first by the heating unit 2850.

The reaction based on the first catalyst may be a heating reaction. The reaction based on the first catalyst may function as a heat source.

Heat generated from the reaction based on the first catalyst may be diffused. The generated heat may be provided to the main housing 2100 and the sub-housing 2800 along the circulation flow.

For example, the heat generated due to the heating reaction may heat the area of the first filter unit 2120 adjacent to the second surface and the first main area 2102.

The area of the first filter unit 2120 adjacent to the second surface and the first main area 2102 may be heated by the heating unit 2850 and the heat generated in the area of the first filter unit 2120 adjacent to the first surface.

For example, the first filter unit 2120 may include a first filter area and a second filter area. In this case, the first filter area may refer to an area closer to the first main area 2102 than the second filter area. In this case, the first filter area may be heated as the heating reaction occurs in the second filter area. As a result, the temperature of the first filter area may be increased by the heating reaction occurring in the second filter area.

The control unit 2200 may control the heating intensity of the heating unit 2850 so that the temperature of the second main area 2104 is included in a predetermined temperature range. In this case, the predetermined temperature range may include the activation temperature of the first catalyst.

When the air purification apparatus 2000 operates in the cleaning mode, the amount of contaminants accumulated in the first filter unit 2120 can be decreased.

The amount of contaminants present in the first filter unit 2120 may correspond to pressure information based on at least any one of the pressure of the first main area 2102 and the pressure of the second main area 2104.

According to one example, the pressure information may be a difference value between the pressure of the first main area 2102 and the pressure of the second main area 2104. When the reaction to the contaminants occurs, the difference between the pressure in the first main area 2102 and the pressure in the second main area 2104 may be decreased.

The pressure information may be information based on the pressure of the first main area 2102 and a predetermined pressure value. As the pressure of the first main area 2102 is greater than the predetermined pressure value, a larger amount of contaminants may be construed as being collected in the first filter unit 2120.

The pressure information may be information based on the pressure of the second main area 2104 and the predetermined pressure value. As the pressure of the second main area 2104 is greater than the predetermined pressure value, a larger amount of contaminants may be construed as being collected in the first filter unit 2120.

When the reaction to the contaminants based on the first catalyst proceeds, a first product may be acquired. For example, when the first catalyst is a cracking catalyst, the first product may be a material in which at least a part of the binding of the contaminants is decomposed. In the process of generating the first product, predetermined heat (which may be reaction heat) may be emitted.

The first product may be moved in the main housing 2100 and the sub-housing 2800 along the circulation flow.

The first product may be provided to the second filter unit 2860. The second filter unit 2860 may receive the first product, and the second filter unit 2860 may acquire a second product.

The second filter unit 2860 may receive the first product and transmit the second product toward the main housing 2100.

The first product may be provided to the second catalyst coated on the second filter unit 2860. The first product may be a reactant for the reaction based on the second catalyst.

At this time, like the first catalyst, when the temperature of the second catalyst is higher than or equal to the activation temperature of the second catalyst, a reaction to the first product based on the second catalyst may occur.

The reaction based on the second catalyst may be a heating reaction. The reaction based on the second catalyst may function as a heat source.

Heat generated from the reaction based on the second catalyst may be diffused. The generated heat may be provided to the main housing 2100 and the sub-housing 2800 along the circulation flow.

A second product may be acquired from the second filter unit 2860. The second product may be a material produced by the reaction based on the second catalyst from the first product.

According to one example, the second catalyst is a diesel oxidation catalyst (DOC).

In this case, the first product may be oxidized when the reaction based on the DOC proceeds. The first product may be oxidized when the reaction based on the DOC proceeds, and thus the second product may be acquired.

The second product may be a material relatively harmless to humans compared to the contaminants. According to one example, the second product may contain carbon dioxide ($CO_2$), oxygen ($O_2$), water ($H_2O$), nitrogen ($N_2$), and the like.

Meanwhile, the first catalyst may be the cracking catalyst and the DOC. In this case, the provided contaminants may be a reactant of the cracking reaction mediated by the first catalyst, and the first product may be acquired by the cracking reaction. The acquired first product may be a reactant of the DOC mediated by the first catalyst, and the second product may be acquired by the oxidation reaction. In this case, the second product may be a material harmless to humans compared to the contaminants. According to one example, as described above, the second product may contain carbon dioxide ($CO_2$), oxygen ($O_2$), water ($H_2O$), nitrogen ($N_2$), and the like.

The second product may be moved along the circulation flow. The second product may be discharged along an opened flow path when the first opening and closing member 2620 or the second opening and closing member 2640 is opened.

The control unit 2200 may determine whether the second filter of the air purification apparatus 2000 is in an abnormal state. When it is determined that the air purification apparatus 2000 is in a state in which the second filter is abnormal, the control unit 2200 may acquire (or output) second filter abnormality information. Whether the second filter is in the abnormal state may be determined when the cleaning mode is completed (or when the air purification apparatus enters the filtering mode).

The control unit 2200 may acquire the state information on the air purification apparatus 2000. The control unit 2200 may determine whether the second filter of the air purification apparatus 2000 is in the abnormal state based on the acquired state information.

The state information may be end pressure data. The end pressure data may be acquired after the cleaning mode operation is ended. In other words, the end pressure data may be acquired at a time point after the air purification apparatus 2000 enters the filtering mode.

In this case, the end pressure data may be acquired within a predetermined time with respect to the time point when the air purification apparatus 2000 enters the filtering mode. The time point when the air purification apparatus 2000 enters the filtering mode may be determined with respect to a time point when the first opening and closing member 2620 and/or the second opening and closing member 2640 are opened.

The end pressure data may be based on at least any one of the pressure of the first main area 2102 and the pressure of the second main area 2104.

The pressure of the first main area 2102 may be measured by the first pressure detection unit 2150. The pressure of the second main area 2104 may be measured by the second pressure detection unit 2160.

When the difference between the pressure of the first main area 2102 and the pressure of the second main area 2104 is greater than or equal to a predetermined differential pressure, the control unit 2200 may determine that the air purification apparatus 2000 is in the state in which the second filter is abnormal.

When the pressure of the first main area 2102 (or the second main area) is greater than or equal to a predetermined pressure value, the control unit 2200 may determine that the air purification apparatus 2000 is in the state in which the second filter is abnormal.

When it is determined that the air purification apparatus 2000 is not in the state in which the second filter is abnormal, the control unit 2200 may determine that the cleaning mode operation state of the air purification apparatus 2000 is normal.

When it is determined that the air purification apparatus 2000 is in the state in which the second filter is abnormal, the control unit 2200 may acquire the second filter abnormality information.

The second filter abnormality information may include information indicating that the cleaning of the first filter unit 2120 does not proceed beyond a certain level even when the air purification apparatus 2000 performs the cleaning mode operation.

According to one example, the air purification apparatus 2000 may further include an alarm unit which may provide information (or data) based on the second filter abnormality information to the user. In this case, the alarm unit may provide the user with information based on the second filter abnormality information as visual information or sound information.

The second filter abnormality information may include information on the necessity for filter replacement or additional cleaning for the air purification apparatus 2000.

The second filter abnormality information may refer to a case in which a material which may not be reacted based on the first catalyst is accumulated in the first filter unit 2120 by a certain amount or more.

The information on the necessity for additional cleaning may include high-pressure cleaning request information. The additional cleaning may refer to the high-pressure cleaning of the first filter unit 2120. The high-pressure cleaning may refer to cleaning the filter through an additional air flow. The high-pressure cleaning may refer to removing the contaminants of the first filter unit 2120 using air pressure injected using separate high-pressure pulsed air in addition to the above-described cleaning operation.

To this end, the main housing 2100 may further include a predetermined installation area where the cleaning unit may be provided. The cleaning unit may be a high-pressure air injection member which may discharge high-pressure air.

According to one example, the predetermined installation area may be positioned on an outer surface of the main housing 2100 corresponding to the second main area 2101. When the cleaning unit is installed in the predetermined installation area, the cleaning unit may generate an air flow in a direction from the outlet 2500 toward the inlet 2300. The cleaning unit may generate an air flow in a direction from the second main area 2104 toward the first main area 2102.

Alternatively, the main housing 2100 may further include the high-pressure air injection member.

The control unit 2200 may acquire the high-pressure cleaning request information or filter replacement request information for the first filter unit 2120 based on the end pressure data.

The control unit 2200 may acquire the filter replacement request information, when the differential pressure between the pressure of the first main area 2102 and the pressure of the second main area 2104 is greater than or equal to a first threshold, and acquire the high-pressure cleaning request information when the differential pressure between the pressure of the first main area 2102 and the pressure of the second main area 2104 is greater than or equal to a second threshold. In this case, the second threshold may be smaller than the first threshold.

The control unit 2200 may acquire the filter replacement request information, when the difference between the pressure of the first main area 2102 and the predetermined pressure is greater than or equal to a third threshold, and acquire the high-pressure cleaning request information when the difference between the pressure of the first main area 2102 and the predetermined pressure is greater than or equal to a fourth threshold. In this case, the fourth threshold may be smaller than the third threshold.

The control unit 2200 may acquire the filter replacement request information, when the difference between the pressure of the second main area 2104 and the predetermined pressure is greater than or equal to a fifth threshold, and acquire the high-pressure cleaning request information when the difference between the pressure of the second main area 2104 and the predetermined pressure is greater than or equal to a sixth threshold. In this case, the sixth threshold may be smaller than the fifth threshold.

After the cleaning operation of the first filter unit 2120 is performed by the cleaning unit, the control unit 2200 may determine whether the filter replacement is required based on at least any one of the first main area 2102 and the second main area 2104.

When the pressure of the first main area 2102 is higher than or equal to a predetermined first threshold pressure after the cleaning operation by the cleaning unit, the control unit 2200 may acquire the filter replacement request information.

When the pressure of the second main area 2104 is higher than or equal to a predetermined second threshold pressure after the cleaning operation by the cleaning unit, the control unit 2200 may acquire the filter replacement request information.

When the pressure of the first main area 2102 and the pressure of the second main area 2104 are higher than or equal to a predetermined third threshold pressure after the cleaning operation by the cleaning unit, the control unit 2200 may acquire the filter replacement request information.

When the control unit 2200 acquires the second filter abnormality information, the communication unit 2600 may transmit to the main server 1000 or the user terminal 3000 the state information on the air purification apparatus 2000 based on the second filter abnormality information.

The air purification apparatus 2000 operating in the cleaning mode may enter the filtering mode according to a predetermined filtering mode entry criterion. The filtering mode entry criterion may be based on the input signal of the manager of the air purification apparatus 2000 or the state information on the air purification apparatus 2000, or may relate to a predetermined time reference.

2-2-3-2 General Cleanable State

Hereinafter, in relation to a more detailed cleaning mode operation of the air purification apparatus 2000, a general cleanable state will be described in detail with reference to FIGS. 6 to 9.

Figure 6:
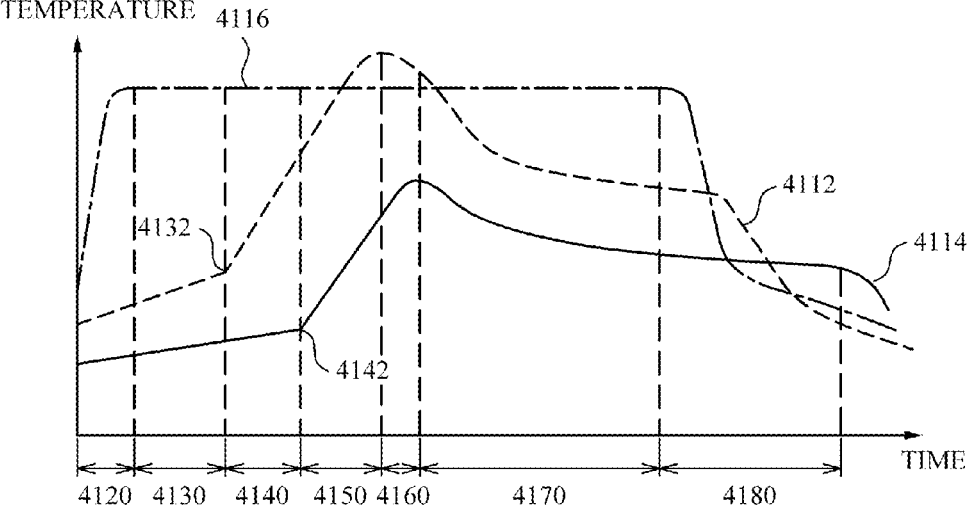
FIGS. 6 and 7 are graphs showing data on a temperature of a specific area over time when the air purification apparatus according to the first embodiment of the present specification operates in the cleaning mode in a general cleanable state.
Figure 7:
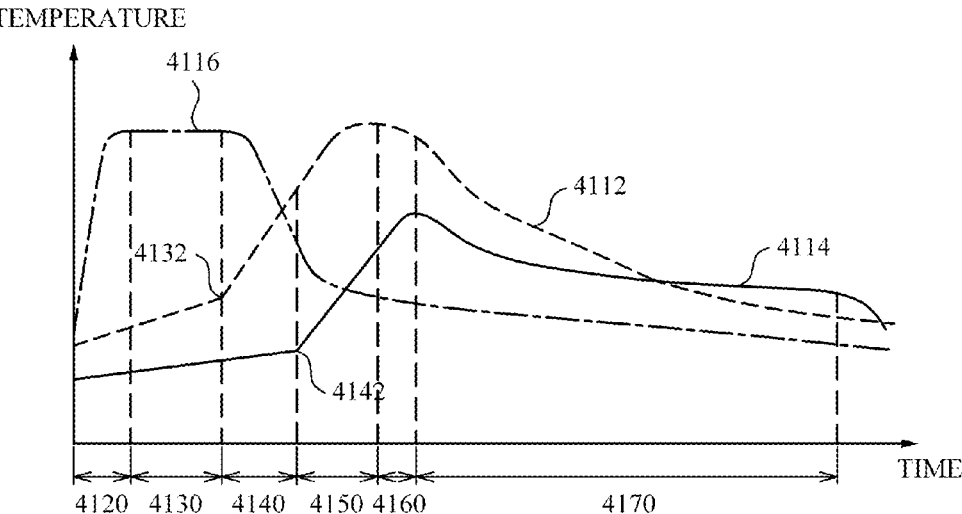

FIGS. 6 and 7 are graphs showing data on a temperature of a specific area over time when the air purification apparatus according to the first embodiment of the present specification operates in the cleaning mode in the general cleanable state.

The general cleanable state may refer to a case in which the cleaning operation efficiency of the air purification apparatus 2000 is higher than or equal to predetermined cleaning efficiency.

The general cleanable state may be a case in which contaminants are collected in the first filter unit 2120 in a first amount or more. The general cleanable state may refer to a state in which the reactant based on the first catalyst is included in the first filter unit 2120 in the first amount or more.

The general cleanable state may refer to a state in which a material which may not be reacted based on the first catalyst coated on the first filter unit 2120 is collected in the first filter unit 2120 in a certain numerical range or less. In this case, the first filter unit 2120 may sufficiently include the reactant of the reaction based on the first catalyst.

Referring to FIG. 6, a cleaning mode operation section of the air purification apparatus may include a first section 4120, a second section 4130, a third section 4140, a fourth section 4150, a fifth section 4160, a sixth section 4170, and a seventh section 4180 in chronological order.

A first graph 4112 represents data on the temperature of the second main area 2104 according to the cleaning mode operating time of the air purification apparatus 2000.

Information on the temperature of the second main area 2104 may be acquired by the second temperature detection unit 2140.

A second graph 4114 represents data on the temperature of the first main area 2102 according to the cleaning mode operating time of the air purification apparatus 2000. Information on the temperature of the first main area 2102 may be acquired by at least any one of the first temperature detection unit 2130 and the emergency temperature detection unit 2190.

A third graph 4116 represents temperature data on the heating unit 2850 according to the cleaning mode operating time of the air purification apparatus 2000. The temperature data of the heating unit 2850 described below may be data on the temperature of an area adjacent to the heating unit 2850. The temperature data of the heating unit 2850 may be data on the temperature of a downstream area of the heating unit 2850 with respect to the air flow direction. Data on the temperature of the heating unit 2850 may be acquired by the third temperature detection unit 2880 or the fourth temperature detection unit 2890. Alternatively, the temperature data of the heating unit 2850 may also be data on the temperature of the heating unit itself and may also be data on a temperature calculated by a voltage applied to the heating unit 2850.

The second main area 2104 may be an upstream area of the first filter unit 2120 with respect to the air flow direction induced by the circulation induction unit 2840.

The first main area 2102 may be a downstream area of the first filter unit 2120 with respect to the air flow direction induced by the circulation induction unit 2840.

The first main area 2102 may be an area farther away from the heating unit 2850 than the second main area 2104 with respect to the circulation flow path.

The first section 4120 may be divided from the second section 4130 with respect to the time point when the temperature of the heating unit 2850 is controlled. Alternatively, the first section 4120 and the second section 4130 may also be divided with respect to the time point when the heating unit 2850 outputs a temperature higher than or equal to a certain temperature.

The second section 4130 may be divided from the third section 4140 with respect to a first division time point 4132.

The first graph 4112 may include the first division time point 4132. A temperature change rate of the first graph 4112 may be different before and after the first division time point 4132. The division time point defined in the present specification is construed to refer to a time point when the degree of temperature change (or speed) is different before and after the division time point unless otherwise specified.

The third section 4140 may be divided from the fourth section 4150 based on a second division time point 4142.

The second graph 4114 may include the second division time point 4142. A temperature change rate of the second graph 4114 may be different before and after the second division time point 4142.

The fourth section 4150 may be divided from the fifth time point 4160 with respect to a time point when the temperature of the first graph 4112 is maximum.

The fifth section 4160 may be divided from the sixth section 4170 with respect to a time point when the temperature of the second graph 4114 is maximum.

The sixth section 4170 may be divided from the seventh section 4180 with respect to a time point when the heating intensity of the heating unit 2850 is controlled.

In the first section 4120, the temperature of the heating unit 2850 may be increased.

At this time, the temperature of the first main area 2102 and the temperature of the second main area 2104 may be increased by the heating unit 2850.

At this time, a temperature increase rate of the second main area 2104 may be greater than a temperature increase rate of the first main area 2102. This may be because the second main area 2104 is closer to the heating unit 2850 than the first main area 2102 with respect to the air flow direction.

In this case, the heating unit 2850 may function as a sole heat source. In other words, the reaction based on the first catalyst coated on the first filter unit 2120 may not occur.

In the second section 4130, the temperature data of the heating unit 2850 may be within a predetermined range. The temperature data of the heating unit 2850 may be kept constant.

At this time, like the first section 4120, the temperature of the first main area 2102 and the temperature of the second main area 2104 may be increased.

At this time, like the first section 4120, the temperature increase rate of the second main area 2104 may be greater than the temperature increase rate of the first main area 2102.

After any one time point in the second section 4130, the reaction based on the first catalyst coated on the first filter unit 2120 may occur. At this time, the generated reaction based on the first catalyst may occur in a partial area of the first filter unit 2120 adjacent to the second main area 2104.

After any one time point in the second section 4130, the reaction based on the second catalyst coated on the second filter unit 2860 may occur.

The first division time point 4132 may be positioned between the second section 4130 and the third section 4140.

The first division time point 4132 may be generated when the reaction proceeds in the first filter unit 2120. The first division time point 4132 may be after the time point when the reaction based on the first catalyst coated on the first filter unit 2120 starts. The first division time point 4132 may correspond to the time point when the reaction starts in an area adjacent to the second main area 2104 of the first filter unit 2120.

Before the first division time point 4132, the heat-generation of the heating unit 2850 functions as a heat source, and after the first division time point 4132, the heat-generation of the heating unit 2850 and the heating reaction in the first filter unit 2120 may function as a heat source.

This may mean that the amount of heat generated in the air purification apparatus 2000 before and after the first division time point 4132 is different, and as a result, the degree of temperature change in the second main area 2104 is different based on the first division time point 4132.

The control unit 2200 may determine whether the cleaning of the first filter unit 2120 has been started based on the data on the temperature of the second main area 2104.

The control unit 2200 may determine that the cleaning of the first filter unit 2120 has been started when the first graph 4112 includes the first division time point 4132.

When it is determined that the cleaning of the first filter unit 2120 has been started, the control unit 2200 may output cleaning start information. The cleaning start information may include information on the fact that the cleaning of the first filter unit has been started (or the reaction to the contaminant has been started).

When the cleaning start information is output, the communication unit 2600 may transmit to the main server 1000 or the user terminal 3000 information indicating that the cleaning operation for the air purification apparatus 2000 has been started.

Meanwhile, according to another embodiment, the heat-generation of the heating unit 2850 may be controlled at a time point corresponding to the first division time point 4132. At the first division time point 4132, the heating intensity of the heating unit 2850 may be decreased. Alternatively, the heat-generation of the heating unit 2850 may be ended at the first division time point 4132.

Referring to FIG. 7, in the third area 4140, the temperature of the first main area 2102 and the temperature of the second main area 2104 may be increased even when the heating intensity of the heating unit 2850 is decreased (or even when the heat-generation of the heating unit is ended).

This may be because the heat of the heating reaction occurring in the first filter unit 2120 may function as a heat source for the first main area 2102 and the second main area 2104. The amount of heat generated by the heating reaction may be greater than the amount of heat generated by the heating unit 2850.

As a result, by adjusting the intensity of the heating unit 2850 at the time point after the time point when the reaction occurs in the first filter unit 2120, it is possible to prevent the excessive heating of the configuration (or air) within the air purification apparatus 2000 and decrease power consumption of the heating unit 2850.

Like the first section 4120 and the second section 4130, in the third section 4140, the temperature of the first main area 2102 and the temperature of the second main area 2104 may be increased.

At this time, the temperature data of the heating unit 2850 may be kept constant. At this time, the reaction based on the first catalyst may occur. At this time, the reaction based on the second catalyst may occur.

In this case, the heat generated by the reaction based on the first catalyst and the heating unit 2850 may function as a heat source. The heat generated by the reaction based on the second catalyst may also function as a heat source.

In the third section 4140, the temperature of the second main area 2104 may be increased by the heating reaction occurring in the first filter unit 2120 in the area adjacent to the second main area 2104 and the heat-generation of the heating unit 2850.

In the third section 4140, the temperature of the first main area 2102 may be increased by the heat generated by the heating unit 2850.

The second division time point 4142 may be positioned between the third section 4140 and the fourth section 4150.

The second division time point 4142 may be generated when the reaction proceeds in the first filter unit 2120. The second division time point 4142 may correspond to the time point when the reaction starts in the area adjacent to the first main area 2102 of the first filter unit 2120.

When the second graph 4114 indicating the data on the temperature of the first main area 2102 includes the second division time point 4142, the reaction may be construed as occurring in the area of the first filter unit 2120 adjacent to the first main area 2102 (i.e., cleaning proceeds).

Heat due to the heating reaction in the area of the first filter unit 2120 adjacent to the second main area 2104 may be diffused along the air flow within the main housing 2100. At this time, the diffused heat may heat the remaining area of the first filter unit 2120.

When at least a part of the first filter unit 2120 enters a first activation temperature or higher—the first activation temperature refers to an activation temperature of the first catalyst—, an area of the first filter unit 2120 which does not reach the first activation temperature may be heated by the heat generated by the reaction which occurs in the area of the first filter unit 2120 having already reached the first activation temperature.

In this case, the first filter unit 2120 may include a first area of the first filter unit 2120 reaching the first activation temperature at the first time point within the third section 4140 and a second area not reaching the first activation temperature at the first time point.

In this case, the second area may be heated by the heat generated by the reaction occurring in the first area. At a second time point later than the first time point, both a temperature of the first area and a temperature of the second area may be higher than or equal to the first activation temperature. An interval between the second time point and the first time point may be shorter due to the reaction based on the first catalyst.

The control unit 2200 may determine whether the cleaning of the first filter unit 2120 has been started based on the data on the temperature of the first main area 2102.

The control unit 2200 may determine that the cleaning of the first filter unit 2120 has been started when the second graph 4114 includes the second division time point 4142.

The control unit 2200 may output cleaning start information when it is determined that the cleaning of the first filter unit 2120 has been started.

When the cleaning start information is output, the communication unit 2600 may transmit to the main server 1000 or the user terminal 3000 the information indicating that the cleaning operation for the air purification apparatus has been started.

In the fourth section 4150, the temperature of the first main area 2102 and the temperature of the second main area 2104 may be increased.

At this time, the temperature data of the heating unit 2850 may be kept constant.

In this case, the heat source of the first main area 2102 may be the heating reaction occurring in the first filter unit 2120 and/or the second filter unit 2860 and the heating unit 2850.

In this case, the heat source of the second main area 2104 may be the heating reaction occurring in the first filter unit 2120 and/or the second filter unit 2860 and the heating unit 2850.

At any time point in the fourth section 4150, the temperature of the second main area 2104 may be higher than the temperature of the heating unit 2850. In the present embodiment, contaminants may be sufficiently collected in the first filter unit 2120 (i.e., a reactant for the first catalyst may be sufficiently present). Accordingly, a sufficiently large amount of reaction occurs in the first filter unit 2120, and thus a large amount of the first product may be acquired as a result of the reaction to the contaminants. In addition, the acquired first product is a reactant to the second filter unit 2860, and a sufficiently large amount of reaction may occur in the second filter unit 2860. The heat generated by the reaction may increase the temperature of the second main area 2104. As a result, the temperature of the second main area 2104 may reverse the temperature data of the heating unit 2850.

In the fourth section 4150, the temperature increase rate of the second main area 2104 may be greater than the temperature increase rate of the first main area 2102. This is because in the fourth section 4150, the reaction actively occurs in the second filter unit 2860, and the second main area 2104 is closer to the second filter unit 2860 than the first main area 2102 with respect to the air flow. In other words, the heat generated by the second filter unit 2860 (due to the reaction) may have a greater effect on the second main area 2104 than on the first main area 2102.

In the analysis of the temperature data of the first main area 2102, the information on the temperature data in the third section 4140 may be different from the information on the temperature data in the fourth section 4150. This may be because the heat sources of the first main area 2102 are different from each other before and after the second division time point 4142.

For example, the third section 4140 may include a first division adjacent section adjacent to the second division time point 4142 and having a predetermined time range, and the fourth section 4150 may include a second division adjacent section adjacent to the second division time point 4142 and having a predetermined time range. In this case, an average temperature increase rate of the first main area 2102 in the first division adjacent section may be smaller than an average temperature increase rate of the first main area 2102 in the second division adjacent section.

The relationship between the temperature of the first main area 2102 and the temperature of the second main area 2104 in the third section 4140 may be different from the relationship between the temperature of the first main area 2102 and the temperature of the second main area 2104 in the fourth section 4160.

The effect of the heating reaction based on the first catalyst on the second main area 2104 may be relatively smaller than the effect of the heating reaction based on the first catalyst on the first main area 2102.

For example, a ratio of the average increase rate of the first main area 2102 in the fourth section 4160 to the average temperature increase rate of the first main area 2102 in the third section 4140 may be greater than a ratio of the average temperature increase rate of the second main area 2104 in the fourth section 4160 to the average temperature increase rate of the second main area 2104 in the third section 4140.

In the fifth section 4160, the temperature of the second main area 2104 may be decreased, and the temperature of the first main area 2102 may be increased. At this time, the temperature data of the heating unit 2850 may be kept constant.

At this time, the scale of the reaction occurring in the second filter unit 2860 may be decreased. At this time, the scale of the reaction occurring in the first filter unit 2120 may be decreased.

In the sixth section 4170, the temperature of the first main area 2102 and the temperature of the second main area 2104 may be decreased.

At this time, the scale of the reaction occurring in the second filter unit 2860 may be decreased. At this time, the scale of the reaction occurring in the first filter unit 2120 may be decreased.

At this time, the temperature data of the heating unit 2850 may be kept constant.

The cleaning of the first filter unit 2120 may be sufficiently performed until any time point before the sixth section 4170. (At at least any time point, the reaction to the contaminants may no longer proceed or a reaction of a scale which is smaller than or equal to a predetermined scale may occur)

At this time, the temperature of the first main area 2102 and/or the temperature of the second main area 2104 may be gradually decreased. (Referring to FIG. 6, the temperature of each area in the sixth section is slowly decreased compared to the other sections) This is because the first main area 2102 and/or the second main area 2104 are heated by the heat emitted by the heated first filter unit 2120.

At the time point of entering the seventh section 4180, the heating intensity of the heating unit 2850 may be controlled. At the time point of entering the seventh section 4180, the heating intensity of the heating unit 2850 may be decreased or the heat-generation of the heating unit 2850 may be ended.

After the heating intensity of the heating unit 2850 is controlled, the temperature of the second main area 2104 may be rapidly decreased. In contrast, since the first main area 2102 is far spaced apart from the heating unit 2850 with respect to the air flow direction, the effect of the change in the heating intensity of the heating unit 2850 on the first main area 2102 may be insignificant compared to the second main area 2104.

Figure 8:
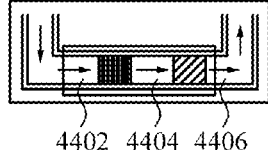
FIG. 8 is a view showing data on a temperature in a sub-housing when the air purification apparatus according to the first embodiment of the present specification is operating in the cleaning mode and no reaction occurs in a second filter unit.
Figure 8:
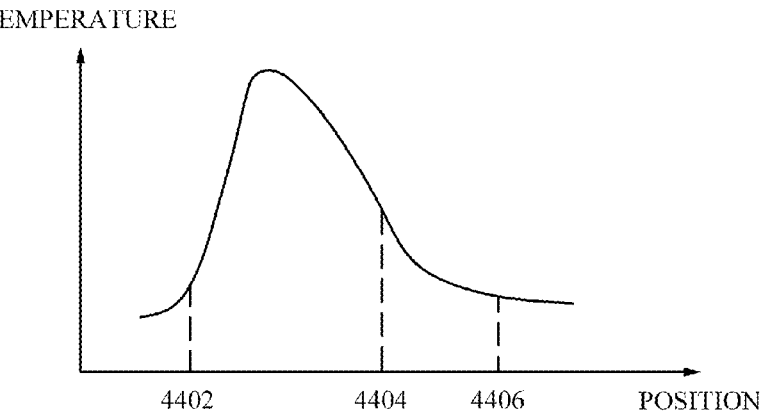
Figure 9:
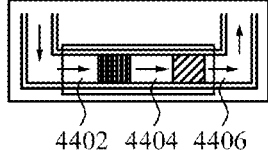
FIG. 9 is a view showing data on the temperature in the sub-housing when the air purification apparatus according to the first embodiment of the present specification is operating in the cleaning mode and a reaction occurs in the second filter unit.
Figure 9:
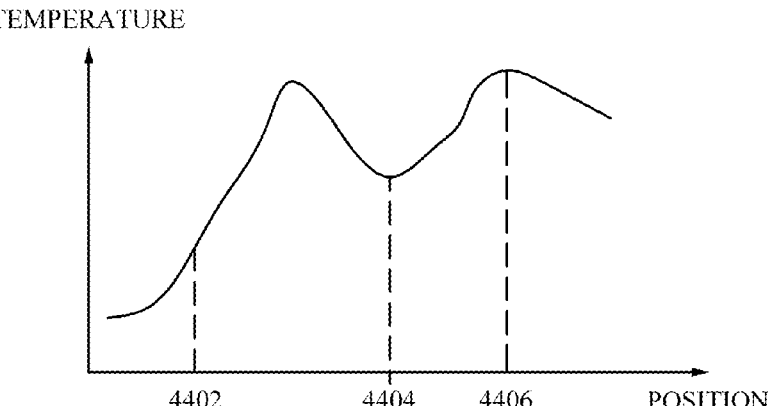

FIGS. 8 and 9 are graphs showing temperature data before and after the second filter unit of the air purification apparatus according to the first embodiment of the present specification.

The temperature data on the area before and after the second filter unit 2860 shown in FIG. 8 may be temperature data at a time point when the reaction based on the second catalyst is not started. The temperature data shown in FIG. 8 may be temperature data of at least any one of the first section 4120 and the second section 4130 described above with reference to FIG. 6.

The temperature data on the area before and after the second filter unit 2860 shown in FIG. 9 may be temperature data after a time point when the reaction based on the second catalyst starts at least. The temperature data shown in FIG. 9 may be temperature data of at least any one of the second section 4130, the third section 4140, and the fourth section 4150 described above with reference to FIG. 6.

The sub-housing 2800 may include a first point 4402, a second point 4404, and a third point 4406.

The first point 4402 may be positioned in an upstream area of the heating unit 2850 with respect to the circulation flow direction.

The second point 4402 may be positioned between the heating unit 2850 and the second filter unit 2860. Information on a temperature of the second point 4404 may be acquired by the third temperature detection unit 2880.

The third point 4406 may be positioned in a downstream area of the second filter unit 2860 with respect to the circulation flow direction. Information on a temperature of the third point 4406 may be acquired by the fourth temperature detection unit 2890.

FIG. 8 is a view showing data on the temperature within the sub-housing 2800 when the air purification apparatus 2000 is operating in the cleaning mode and no reaction occurs in the second filter unit 2860.

When no reaction occurs in the second filter unit 2860, a point having the highest temperature within the sub-housing 2800 may be positioned between the first point 4402 and the second point 4404. At this time, the highest temperature point may be positioned in a downstream area adjacent to the heating unit 2850 with respect to the circulation flow direction.

When no reaction occurs in the second filter unit 2860, a temperature of the third point 4406 may be at least lower than a temperature of the second point 4404. When the temperature of the second catalyst—the second catalyst is coated on the second filter unit 2680—is lower than the activation temperature of the second catalyst, the temperature of the third point 4406 may be lower than the temperature of the second point 4404. At this time, the heat source of the second point 4404 and the third point 4406 may be the heating unit 2850.

FIG. 9 is a view showing data on the temperature within the sub-housing 2800 when the air purification apparatus 2000 is operating in the cleaning mode and the reaction occurs in the second filter unit 2860.

When the heating reaction occurs in the second filter unit 2860, the heat generated by the heating reaction may function as a heat source. The heat generated by the heating reaction may be diffused along the circulation flow.

The heat source of the third point 4406 may be heat due to the heat generated by the heating unit 2850 and the heating reaction occurring in the second filter unit 2860.

The heat due to the heating reaction occurring in the second filter unit 2860 may have a greater effect on the downstream area of the circulation flow than on the upstream area of the circulation flow. In other words, the heat generated by the reaction based on the second catalyst may function as a greater heat source at the second point 4404 than at the third point 4406.

When the reaction based on the second catalyst occurs, a temperature of at least a part of the third point 4406 may be higher than the temperature of the second point 4404. According to one example, at least a part of the third point 4406 may be higher than a temperature of a point very adjacent to the heating unit 2850.

The temperature of the second point 4404 may be lower than the temperature of the third point 4406 even when the second point 4404 is closer to the heating unit 2805 than the third point 4406.

The control unit 2200 may determine that the cleaning of the first filter unit 2120 has been ended according to a predetermined cleaning end criterion. When it is determined that the cleaning of the first filter unit 2120 has been ended, the control unit may acquire (or output) cleaning end information.

When the temperature of the first main area 2102 is lower than (or lower than or equal to) a predetermined temperature, the control unit 2200 may determine that the cleaning of the first filter unit 2120 has been ended.

When the temperature of the second main area 2104 is lower than (or lower than or equal to) the predetermined temperature, the control unit 2200 may determine that the cleaning of the first filter unit 2120 has been ended.

When a difference value between the temperature of the first main area 2102 and the temperature of the second main area 2104 is smaller than or equal to a predetermined temperature difference value, the control unit 2200 may determine that the cleaning of the first filter unit 2120 has been ended.

When a predetermined first time elapses with respect to a time point when the cleaning mode is entered, the control unit 2200 may determine that the cleaning of the first filter unit 2120 has been ended.

When a predetermined time elapses with respect to the time point when the heat-generation of the heating unit 2850 starts, the control unit 2200 may determine that the cleaning of the first filter unit 2120 has been ended.

When a predetermined time elapses with respect to the time point when the temperature of the heating unit 2850 is constantly controlled, the control unit 2200 may determine that the cleaning of the first filter unit 2120 has been ended.

When the temperature of the second main area 2104 (or the temperature of the first main area 2102) does not exceed a predetermined temperature within a predetermined second time, the control unit 2200 may determine that the cleaning of the first filter unit 2120 has been ended.

When it is determined that the cleaning of the first filter unit 2120 has been ended, the heat-generation of the heating unit 2850 may be ended.

The cleaning end information may include information on the fact that cleaning of the first filter unit has been ended. When the cleaning end information is output, the communication unit 2600 may transmit to the main server 1000 or the user terminal 3000 information indicating that the cleaning operation of the air purification apparatus has been ended.

Although not shown in the drawings, the heat-generation of the heating unit 2850 may be ended when the control unit 2200 acquires the cleaning end information.

The air purification apparatus 2000 may enter the filtering mode from the cleaning mode according to a predetermined criterion.

When the air purification apparatus 2000 enters the filtering mode, the communication unit 2600 may transmit the filtering mode entry related data to the main server 1000 or the user terminal 3000.

The air purification apparatus 2000 may enter the filtering mode when the temperature of the main housing 2100 or the sub-housing 2800 is lower than or equal to a mode switching temperature.

The control unit 2200 may acquire filter normal operation information when the air purification apparatus 2000 is in a normal cleanable state after the above-described cleaning operation is performed.

The communication unit 2600 may transmit to the main server 1000 or the user terminal 3000 state information on the air purification apparatus 2000 including the filter normal operation information. The communication unit 2600 may transmit data on a temperature during the cleaning mode operation of the air purification apparatus 2000 in a normal state.

Meanwhile, as described above with reference to FIG. 2, the air purification apparatus 2000 may include the adsorption unit 2540, and the particulate matter may be accumulated in the adsorption unit 2540 while the air purification apparatus 2000 operates in the filtering mode.

The adsorption unit 2540 may be cleaned when the air purification apparatus 2000 enters the filtering mode. When the second opening and closing member 2640 is opened, the adsorption unit 2540 may be cleaned by the air provided (or heat of the air provided) from the main housing 2100.

In order to clean the adsorption unit 2540, a temperature of the air provided from the main housing 2100 may need to be higher than or equal to a predetermined adsorption cleaning temperature. According to one example, the mode switching temperature may be at least higher than the adsorption cleaning temperature.

When the air purification apparatus 2000 enters the filtering mode, the individual components of the air purification apparatus 2000 may perform the predetermined operations described above with reference to FIG. 4.

2-2-3-3 Excessively Cleanable State

Hereinafter, in relation to a more detailed cleaning mode operation of the air purification apparatus 2000, the excessively cleanable state will be described in detail with reference to FIG. 10. However, the contents that may overlap the above-described contents will be omitted, and common technical characteristics will be construed with reference to the above-described contents including the contents on the general cleanable state.

Figure 10:
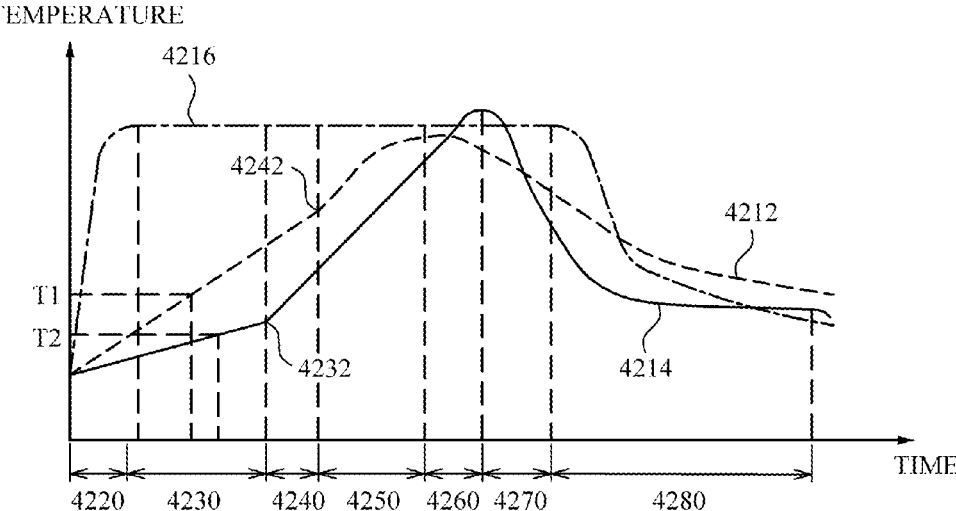
FIG. 10 is a graph showing data on a temperature of a specific area over time when the air purification apparatus according to the first embodiment of the present specification operates in the cleaning mode in an excessively cleanable state.

FIG. 10 is a graph showing data on a temperature of a specific area over time when the air purification apparatus according to the first embodiment of the present specification operates in the cleaning mode in an excessively cleanable state.

The excessively cleanable state may be a case in which contaminants are collected in the first filter unit 2120 in a second amount or more. The excessively cleanable state may refer to a state in which the reactant based on the first catalyst is included in the first filter unit 2120 in the second amount or more.

In this case, the second amount refers to the general cleanable state and may have a larger value than the above-described first amount. In other words, the excessively cleanable state may refer to a state in which the reactant of the reaction mediated by the first catalyst is excessively collected in the first filter unit 2120.

The air purification apparatus in the excessively cleanable state and the air purification in the general cleanable state may be divided based on the graph showing the temperature according to the cleaning operation.

Referring to FIG. 10, a cleaning mode operation section of the air purification apparatus may include a first section 4220, a second section 4230, a third section 4240, a fourth section 4250, a fifth section 4260, a sixth section 4270, and a seventh section 4280 in chronological order.

A first graph 4212 represents data on the temperature of the second main area 2104 according to the cleaning mode operating time of the air purification apparatus 2000.

A second graph 4214 represents data on the temperature of the first main area 2102 according to the cleaning mode operating time of the air purification apparatus 2000.

A third graph 4216 represents temperature data on the heating unit 2850 according to the cleaning mode operating time of the air purification apparatus 2000.

The first section 4220 may be divided from the second section 4230 with respect to the time point when the temperature of the heating unit 2850 is controlled. Alternatively, the first section 4220 and the second section 4230 may be divided with respect to the time point when the heating unit 2850 outputs a temperature which is higher than or equal to a predetermined temperature.

The second section 4230 may be divided from the third section 4240 with respect to a second division time point 4232.

The second graph 4214 may include the second division time point 4232. A temperature change rate of the second graph 4214 may be different before and after the second division time point 4232.

The third section 4240 may be divided from the fourth section 4250 with respect to a first division time point 4242.

The first graph 4212 may include the first division time point 4242. A temperature change rate of the first graph 4212 may be different before and after the first division time point 4242.

The fourth section 4250 may be divided from the fifth section 4260 with respect to a time point when the temperature of the first graph 4212 is maximum.

The fifth section 4260 may be divided from the sixth section 4270 with respect to a time point when the temperature of the second graph 4214 is maximum.

The sixth section 4270 may be divided from the seventh section 4280 with respect to a time point when the heating intensity of the heating unit 2850 is controlled.

In the first section 4220, the temperature data of the heating unit 2850 may be increased.

At this time, the temperature of the first main area 2102 and the temperature of the second main area 2104 may be increased by being heated by the heating unit 2850.

In the second section 4230, the temperature data of the heating unit 2850 may be kept constant.

At this time, the temperature of the first main area 2102 and the temperature of the second main area 2104 may be increased by being heated by the heating unit 2850.

At at least any time point of the second section 4230, the temperature of the second main area 2104 may be a first temperature T1. At at least any time point of the second section 4230, the temperature of the first main area 2102 may be a second temperature T2.

When the temperature of the second main area 2104 is higher than or equal to the first temperature, the control unit 2200 may determine that cleaning of the first filter unit 2120 has been started.

As described above with reference to the contents of the general cleanable state, whether to start cleaning may be determined depending on whether the graph on the temperature of the second main area 2104 has the division time point, but even when the division time point is not included, it may be determined that the cleaning of the first filter unit 2120 has been started when the temperature of the second main area 2104 is higher than or equal to the predetermined temperature.

Alternatively, when the temperature of the first main area 2102 is higher than or equal to the second temperature, the control unit 2200 may determine that the cleaning of the first filter unit 2120 has been started.

The control unit may acquire cleaning start information when it is determined that the cleaning of the air purification apparatus 2000 (i.e., of the first filter unit 2120) has been started.

Meanwhile, according to another embodiment, the heat-generation of the heating unit 2850 may be controlled at a time point having the first temperature. At a time point corresponding to the first temperature, the heating intensity of the heating unit 2850 may be decreased.

Alternatively, the heat-generation of the heating unit 2850 may be controlled at a time point having the second temperature. At a time point corresponding to the second temperature, the heating intensity of the heating unit 2850 may be decreased.

In other words, as described above with reference to FIG. 7, when the temperature data of the first main area (or the second main area) includes the division time point, the control unit 2200 may control the heating intensity of the heating unit 2850 with respect to the division time point. Likewise, when the temperature of the first main area 2102 (or the second main area 2104) is higher than or equal to the first temperature (or the second temperature) even when the division time point is not present, the control unit 2200 may determine that the cleaning of the first filter unit 2120 has been started.

At this time, the first temperature may correspond to the activation temperature of the first catalyst. In other words, when the temperature of the second main area 2104 is at least higher than the activation temperature of the first catalyst, the first filter unit 2120 positioned downstream of the second main area 2104 may be heated to be higher than the activation temperature of the first catalyst. As a result, the reaction based on the first catalyst may occur in at least a part of the first filter unit 2120.

The technical characteristics of the second division time point 4232 may be substantially the same as those of the second division time point 4142 described above with reference to FIG. 6.

At the third time point 4240, the temperature data of the heating unit 2850 may be kept constant. At this time, the temperature of the first main area 2102 and the temperature of the second main area 2104 may be increased. At this time, the reaction based on the first catalyst and/or the reaction based on the second catalyst may function as the heat sources for the above-described areas.

The first division time point 4242 may be positioned between the third section 4240 and the fourth section 4250. The first division time point 4242 may occur when the reaction based on the second catalyst occurs.

At the fourth time point 4250, the temperature data of the heating unit 2850 may be kept constant. At this time, the temperature of the first main area 2102 and the temperature of the second main area 2104 may be increased.

At the fifth time point 4260, the temperature data of the heating unit 2850 may be kept constant. At this time, the temperature of the first main area 2102 may be decreased. The temperature of the second main area 2104 may be increased.

At any time point of the fifth section 4260, the temperature of the first main area 2102 may reverse the temperature of the second main area 2104.

At this time, as the temperature of the first main area 2102 reverses the temperature of the second main area 2104, the control unit 2200 may determine that the cleaning of the first filter unit 2120 has been started.

At any time point of the fifth section 4260, the temperature of the first main area 2102 may be higher than the temperature of the heating unit 2850.

In the embodiment, the contaminants may be excessively collected in the first filter unit 2120 (i.e., the reactant to the first catalyst is excessively present).

Accordingly, an excessively large amount of reaction may occur in the first filter unit 2120, and the first product may be acquired as the reaction to the contaminants proceeds. At this time, the first catalyst may partially function as the DOC. Even when the acquired first product is not provided to the second filter unit 2860, the acquired first product may be oxidized to acquire the second product. In other words, a predetermined reaction and oxidation reaction for acquiring the first product may proceed in the first filter unit 2120. In other words, in the excessively cleanable state, the second product may be acquired from the first filter unit 2120 unlike the general cleanable state. Accordingly, compared to the general cleanable state, less the first product may be provided to the second filter unit 2860 in the excessively cleanable state. The first product may be the reactant of the reaction based on the second catalyst coated on the second filter unit 2860. As a result, the amount of reaction occurring in the second filter unit 2860 in the excessively cleanable state may be smaller than the amount of reaction occurring in the second filter unit 2860 in the general cleanable state. With respect to the air flow direction, the first main area 2102 may be farther spaced apart from the second filter unit 2860 than the second main area 2104. Accordingly, the amount of reaction occurring in the second filter unit 2860 decreased in the excessively cleanable state may have a greater effect on the second main area 2104 than on the first main area 2102. In addition, the amount of reaction occurring in the first filter unit 2120 increased in the excessively cleanable state may have a greater effect on the first main area 2102 than the second main area 2104.

In this case, the predetermined reaction and the oxidation reaction are the heating reactions, and may increase the temperature of the first main area 2102 positioned in the downstream area of the first filter unit 2120 with respect to the air flow direction.

As a result, the temperature of the first main area 2102 may reverse the temperature data of the heating unit 2850.

At the sixth time point 4270, the temperature data of the heating unit 2850 may be decreased. At this time, the heat-generation of the heating unit 2850 may be ended.

At this time, the temperature of the first main area 2102 and the temperature of the second main area 2104 may be decreased. The temperature of the second main area 2104 may be rapidly decreased compared to the temperature of the first main area 2102. This may be because the first main area 2102 is positioned to be farther spaced apart from the second filter than the second main area 2104 with respect to the air flow.

At any time point of the sixth section 4270, the temperature of the first main area 2102 may be lower than the temperature of the second main area 2104.

At this time, as the temperature of the first main area 2102 is lower than the temperature of the second main area 2104, the control unit 2200 may determine that the cleaning of the first filter unit 2120 has been ended.

At the seventh time point 4280, the temperature of the first main area 2102 and the temperature of the second main area 2104 may be decreased. Due to the heat of the first filter heated in the above-described section, the temperature of the first main area 2102 may be smoothly decreased compared to the temperature of the second main area 2104.

The air purification apparatus 2000 may enter the filtering mode according to the predetermined filtering mode entry criterion.

2-2-3-4 Abnormal Cleanable State

Hereinafter, in relation to the cleaning mode operation of the air purification apparatus, the abnormal cleanable state will be described in detail. However, in the contents related to the abnormal cleanable state, the contents overlapping with the contents described with respect to the general cleanable state and the excessively cleanable state may be omitted, and the contents related to the abnormal cleanable state should be construed in consideration of the above description.

When the air purification apparatus 2000 is in an abnormal cleanable state, the cleaning of the first filter unit 2120 may not be sufficiently performed.

The abnormal cleanable state may be a case in which the amount of contaminants collected in the first filter unit 2120 is less than a certain range. The abnormal cleanable state may refer to a state in which the reactant based on the first catalyst coated on the first filter unit 2120 is included less than a predetermined amount in the first filter unit 2120.

Alternatively, the abnormal cleanable state may be a case in which a material that may not be reacted based on the first catalyst coated on the first filter unit 2120 is collected in the first filter unit 2120 in a certain numerical range or more.

The air purification apparatus in the abnormal cleanable state and the air purification apparatus in the normal cleanable state may be divided with respect to the graph showing the temperature according to the cleaning operation.

Figure 11:
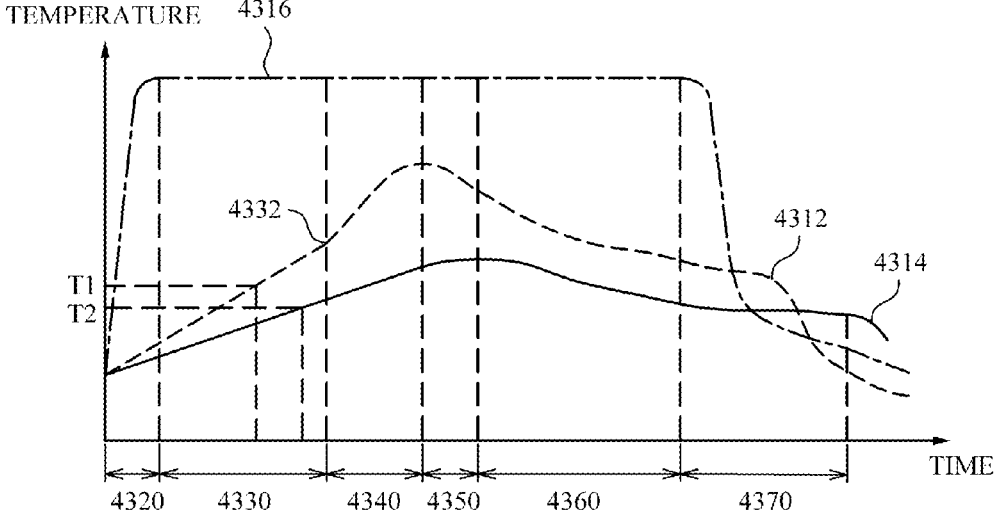
FIG. 11 is a graph showing data on a temperature of a specific area over time when the air purification apparatus according to the first embodiment of the present specification operates in the cleaning mode in an abnormal cleanable state.

FIG. 11 is a graph showing data on a temperature of a specific area over time when the air purification apparatus according to the first embodiment of the present specification operates in the cleaning mode in the abnormal cleanable state.

Referring to FIG. 11, an operation section of the cleaning mode of the air purification apparatus 2000 in the abnormal cleanable state may include a first section 4320, a second section 4330, a third section 4340, a fourth section 4350, a fifth section 4360, and a sixth section 4370 in chronological order.

A first graph 4312 represents the data on the temperature of the second main area 2104 according to the cleaning mode operating time of the air purification apparatus (in the abnormal cleanable state).

A second graph 4314 represents the data on the temperature of the first main area 2102 according to the cleaning mode operating time of the air purification apparatus (in the abnormal cleanable state).

A third graph 4316 represents the data on the temperature of the heating unit 2850 according to the cleaning mode operating time of the air purification apparatus 2000.

The first section 4320 may be divided from the second section 4330 with respect to a time point when the temperature data of the heating unit 2850 is constantly controlled. Alternatively, the first section 4320 and the second section 4330 may be divided with respect to the time point when the heating unit 2850 outputs a temperature which is higher than or equal to a predetermined temperature.

The second section 4330 may be divided from the third section 4340 with respect to a first division time point 4332.

The third section 4340 may be divided from the fourth section 4350 with respect to the maximum time point of the temperature data of the first graph 4312.

The fourth section 4350 and the fifth section 4360 may be divided with respect to the maximum time point of the temperature data of the second graph 4314.

The fifth section 4360 may be divided from the sixth section 4370 with respect to the time point when the heating intensity of the heating unit 2850 is controlled.

In the first section 4320, the temperature data of the heating unit 2850 may be increased.

At this time, the temperature of the first main area 2102 and the temperature of the second main area 2104 may be increased by being heated by the heating unit 2850.

In the second section 4330, the temperature data of the heating unit 2850 may be kept constant.

At this time, the temperature of the first main area 2102 and the temperature of the second main area 2104 may be increased by being heated by the heating unit 2850.

At at least any time point of the second section 4330, the temperature of the second main area 2104 may be a first temperature T1. At at least any time point of the second section 4330, the temperature of the first main area 2102 may be a second temperature T2. The first temperature may be higher than the second temperature.

At this time, when the temperature of the second main area 2104 is higher than or equal to the first temperature, the control unit 2200 may determine that the cleaning of the first filter unit 2120 has been started. Alternatively, when the temperature of the first main area 2102 is higher than or equal to the second temperature, the control unit 2200 may determine that the cleaning of the first filter unit 2120 has been started.

At at least any time point of the second section 4330, the reaction based on the first catalyst may occur in the first filter unit 2120.

The first division time point 4332 may be present when the reaction occurs in the first filter unit 2120.

The control unit 2200 may determine that the cleaning of the first filter unit 2120 has been started when the first division time point 4332 is generated.

According to another embodiment, the heating intensity of the heating unit 2850 may be controlled at a time point corresponding to the first division time point 4332.

At the third time point 4340, the temperature data of the heating unit 2850 may be kept constant. At this time, the temperature of the first main area 2102 and the temperature of the second main area 2104 may be increased.

At the fourth time point 4350, the temperature data of the heating unit 2850 may be kept constant. At this time, the temperature of the first main area 2102 may be decreased. The temperature of the second main area 2104 may be increased.

Referring to FIG. 11, it can be seen that in the air purification apparatus in the abnormal cleanable state, contaminants (i.e., reactants) are not sufficiently collected in the first filter unit 2120, so that the temperatures of the first main area 2102 or the second main area 2104 do not reverse the temperature data of the heating unit 2850.

At the fifth time point 4360, the temperature data of the heating unit 2850 may be kept constant. At this time, the temperature of the first main area 2102 and the temperature of the second main area 2104 may be decreased.

At the sixth time point 4370, the temperature data of the heating unit 2850 may be decreased. At this time, the heat-generation of the heating unit 2850 may be ended. At this time, the temperature of the first main area 2102 and the temperature of the second main area 2104 may be decreased.

The air purification apparatus 2200 may enter the filtering mode according to the predetermined filtering mode entry criterion.

2-2-3-5 Non-Cleanable State

Hereinafter, in relation to the cleaning mode operation of the air purification apparatus, the cleaning impossible state will be described in detail. However, in the contents related to the cleaning impossible state, the contents overlapping with the contents related to the general cleanable state, the excessively cleanable state, and the abnormal cleanable state may be omitted, and the contents related to the cleaning impossible state should be construed in consideration of the above description.

When the air purification apparatus 2000 is in the cleaning impossible state, the cleaning of the first filter unit 2120 may be performed in a very small amount or may not be performed.

The cleaning impossible state may be a case in which a material which may not be reacted based on the first catalyst coated on the first filter unit 2120 is collected in the first filter unit 2120 in a certain numerical range or more. For example, the cleaning impossible state may be a case in which contaminants are solidified in the first filter unit 2120 (due to cooling in winter or the like).

The air purification apparatus in the cleaning impossible state and the air purification apparatus in the general cleanable state may be divided with respect to the graph showing the temperature according to the cleaning operation.

Figure 12:
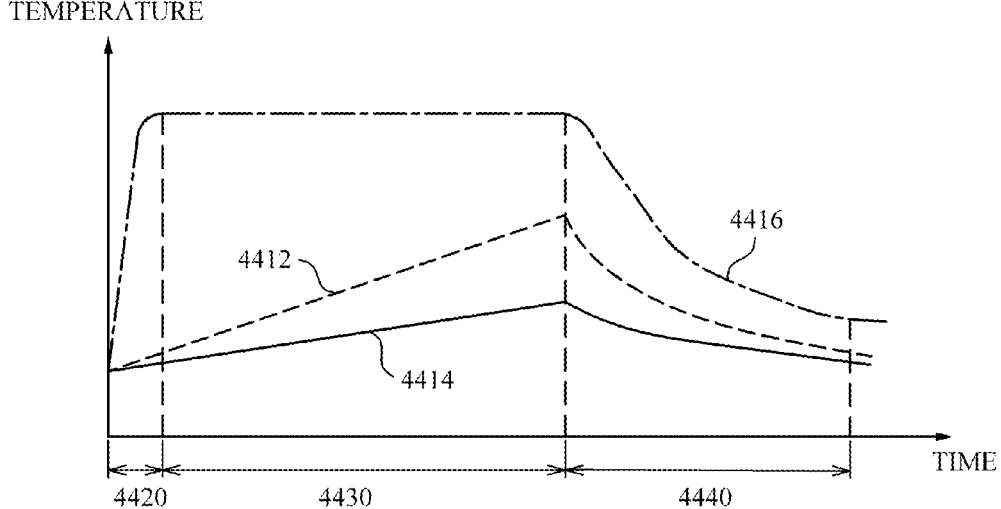
FIG. 12 is a graph showing data on a temperature of a specific area over time when the air purification apparatus according to the first embodiment of the present specification operates in the cleaning mode in a non-cleanable state.

FIG. 12 is a graph showing data on a temperature of a specific area over time when the air purification apparatus according to the first embodiment of the present specification operates in the cleaning mode in the cleaning impossible state.

Referring to FIG. 12, an operation section of the cleaning mode of the air purification apparatus 2000 in the cleaning impossible state may include a first section 4420, a second section 4430, and a third section 4440 in chronological order.

A first graph 4412 represents data on the temperature of the second main area 2104 according to the cleaning mode operating time of the air purification apparatus (in the cleaning impossible state).

A second graph 4414 represents data on the temperature of the first main area 2102 according to the cleaning mode operating time of the air purification apparatus (in the cleaning impossible state).

A third graph 4416 is a graph showing the temperature data of the heating unit 2850 according to the cleaning mode operating time of the air purification apparatus (in the cleaning impossible state).

The first section 4420 may be divided from the second section 4430 with respect to a time point when the temperature data of the heating unit 2850 is constantly controlled. Alternatively, the first section 4420 and the second section 4430 may be divided with respect to the time point when the heating unit 2850 outputs a temperature which is higher than or equal to a predetermined temperature.

The second section 4430 may be divided from the third section 4440 at a time point when the heating intensity of the heating unit 2850 is controlled.

In the first section 4420, the temperature of the first main area 2102 and the temperature of the second main area 2104 may be increased by being heated by the heating unit 2805. At this time, the temperature data of the heating unit 2805 may be increased.

In the second section 4430, the temperature of the first main area 2102 and the temperature of the second main area 2104 may be increased by being heated by the heating unit 2805. At this time, the temperature data of the heating unit 2805 may be kept constant.

At this time, the reaction based on the first catalyst provided to the first filter unit 2120 may not occur. At this time, the reaction based on the second catalyst provided to the second filter unit 2860 may not occur.

At this time, the temperature of the first main area 2102 may not be increased to a first cleanable temperature or higher. The temperature of the second main area 2104 may not be increased to a second cleanable temperature or higher. At this time, the first cleanable temperature may be different from the second cleanable temperature.

The control unit 2200 may determine that the cleaning of the first filter unit 2120 has not started based on that a predetermined division point is not included in the first graph 4412 and the second graph 4414.

The control unit 2200 may determine that the cleaning of the first filter unit 2120 does not proceed when the division point for the first graph 4412 and the second graph 4414 is not generated within a predetermined time.

The control unit 2200 may determine that the cleaning has been ended after a predetermined time with respect to the time point when the operation of the air purification apparatus 2000 in the cleaning mode starts. The control unit 2200 may determine that the cleaning of the first filter unit 2120 has been ended after a predetermined time with respect to the time point when the heat-generation of the heating unit 2850 starts. The control unit 2200 may determine that the cleaning of the first filter unit 2120 has been ended after the predetermined time with respect to the time point when the temperature of the heating unit 2850 is kept constant (or a case of belonging to a certain range may also be included).

When it is determined that the cleaning of the air purification apparatus 2000 has been ended, the heat-generation of the heating unit 2850 may be ended.

In the third section 4440, the temperature of the first main area 2102 and the temperature of the second main area 2104 may be decreased as the heating intensity of the heating unit 2850 is controlled (or as the heat-generation of the heating unit 2850 is ended).

The control unit 2200 may acquire information on the cleaning impossible state when the cleaning is ended without performing an operation of determining that the cleaning of the air purification apparatus 2000 has been started.

When the information on the cleaning impossible state is acquired, the communication unit 2600 may transmit to the main server 1000 or the user terminal 3000 information including that the air purification apparatus 2000 is in the cleaning impossible state.

Hereinafter, an emergency mode, which is another operation mode of the air purification apparatus 2000 according to the first embodiment, will be described in detail below.

2-2-4 Emergency Mode 2-2-4-1 General

The air purification apparatus 2000 according to the first embodiment of the present specification may operate in the emergency mode. The air purification apparatus 2000 may operate in the emergency mode when an emergency situation occurs.

The emergency situation as defined herein may refer to an abnormal situation including a fire occurrence situation, a fire dangerous situation, a situation where an area to be detected is in an abnormally high-temperature state, or the like.

In this case, the emergency mode may include a first emergency mode and a second emergency mode.

In the first emergency mode, power supply to at least some components of the air purification apparatus 2000 may be cut off.

In the second emergency mode, the air purification apparatus 2000 may perform a predetermined operation according to a place where the emergency situation occurs.

Hereinafter, details of the emergency mode will be described.

2-2-4-2 First Emergency Operation

Hereinafter, the first emergency mode of the air purification apparatus according to the first embodiment of the present specification will be described with reference to FIGS. 13 to 15.

Figure 13:
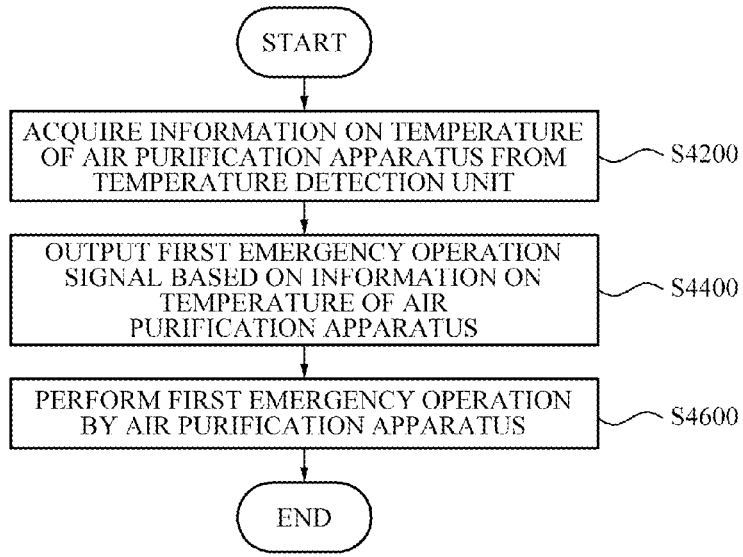
FIG. 13 is a flowchart showing a first emergency operation method of the air purification apparatus according to the first embodiment of the present specification.

FIG. 13 is a flowchart showing a first emergency operation method of the air purification apparatus according to the first embodiment of the present specification.

Referring to FIG. 13, the first emergency operation method of the air purification apparatus 2000 may include an operation of acquiring information on a temperature of the air purification apparatus from a temperature detection unit (S4200), an operation of outputting a first emergency operation signal based on the information on the temperature of the air purification apparatus (S4400), and an operation of performing a first emergency operation by the air purification apparatus (S4600).

In the operation of acquiring (S4200), the information on the temperature of the air purification apparatus 2000 may be acquired.

At this time, the control unit 2200 may acquire the temperature data of the air purification apparatus 2000 from at least any one of the first temperature detection unit 2130, the second temperature detection unit 2140, the third temperature detection unit 2880, the fourth temperature detection unit 2890, and the emergency temperature detection unit 2190.

In this case, when an emergency situation occurs for the air purification apparatus 2000, at least any one temperature detection unit needs to be in an operable state.

Figure 14:
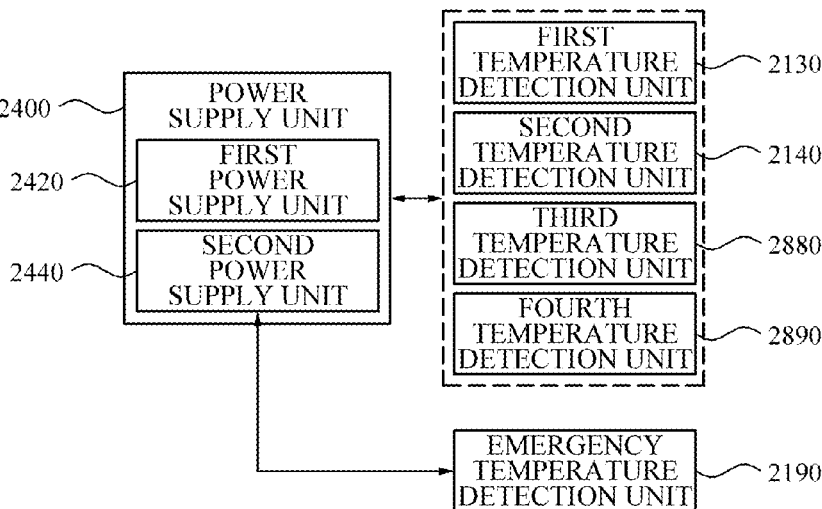
FIG. 14 is a configuration diagram showing a separate power supply path to an emergency temperature detection unit of the air purification apparatus according to the first embodiment of the present specification.

FIG. 14 is a configuration diagram showing a separate power supply path to the emergency temperature detection unit of the air purification apparatus according to the first embodiment of the present specification.

Referring to FIG. 14, the power supply unit 2400 may include a first power supply unit 2420 and a second power supply unit 2440.

The emergency temperature detection unit 2190 may acquire the information on the temperature of the area within the air purification apparatus 2000 even when the operations of the first to fourth temperature detection units 2130, 2140, 2880, and 2890 are stopped due to the emergency situation.

The first power supply unit 2420 may apply power to any one of the individual components of the air purification apparatus 2000 even when the second power supply unit 2440 is inoperable.

The second power supply unit 2440 may apply power to any one of the individual components of the air purification apparatus 2000 even when the first power supply unit 2420 is inoperable.

The first power supply unit 2420 may apply power to at least any one of the first to fourth temperature detection units 2130, 2140, 2880, and 2890.

The second power supply unit 2440 may apply power to the emergency temperature detection unit 2190.

The control unit 2200 may acquire the information on the temperature of the air purification apparatus 2000 from the emergency temperature detection unit 2190 even when the first to fourth temperature detection units 2130, 2140, 2880, and 2890 may not acquire the information on the temperature of the air purification apparatus 2000.

After the operation of acquiring (S4200), the operation of outputting the first emergency operation signal based on the information on the temperature of the air purification apparatus (S4400) may be performed.

At this time, the control unit 2200 may determine whether the air purification apparatus 2000 is in the emergency situation based on the acquired temperature data.

The control unit 2200 may determine that the air purification apparatus 2000 is in the emergency situation when the temperature of at least a partial area in the air purification apparatus 2000 is higher than or equal to a predetermined emergency temperature.

Specifically, when the temperature of the air purification apparatus 2000 based on the temperature data transmitted from the emergency temperature detection unit 2190 is higher than or equal to the predetermined emergency temperature, the control unit 2200 may output the first emergency operation signal.

After the operation of outputting (S4400), the performing of the first emergency operation by the air purification apparatus 2000 may be performed.

Although not shown in the drawing, even when the information on the temperature of the air purification apparatus 2000 is not acquired (i.e., even when an operation is not after the operation of outputting (S4400)), the air purification apparatus 2000 may perform the first emergency operation according to the input provided from the user.

The air purification apparatus 2000 may enter the first emergency mode. When the air purification apparatus 2000 enters the first emergency mode, the individual components of the air purification apparatus 2000 may perform the predetermined first emergency operation. In this case, power supply to at least any one of the individual components of the air purification apparatus 2000 may be cut off.

When acquiring the first emergency operation signal, the control unit 2200 may output a power cutoff signal to the power supply unit 2400.

The power supply unit 2400 may cut off power supply to the individual components of the air purification apparatus 2000. The power supply unit 2400 may cut off power supply to the heating unit 2850 at least based on the power cutoff signal.

The power supply unit 2400 may cut off power supply to a power application configuration to which power may be applied. As the power application configuration, all components to which the power may be supplied among the individual components of the air purification apparatus 2000 including the first temperature detection unit 2130, the first pressure detection unit 2150, the circulation induction unit 2840, and the heating unit 2850 are applicable.

According to one example, the power cut-off signal may be based on the emergency temperature detection unit 2190. In other words, the power supply unit 2200 may cut off the power supply to the individual components even when the first to fourth temperature detection units are in an inoperable state.

However, according to another example, even when the control unit 2200 does not acquire the first emergency operation signal, the power supply to the individual components provided from the power supply unit 2200 may be cut off.

Figure 15:
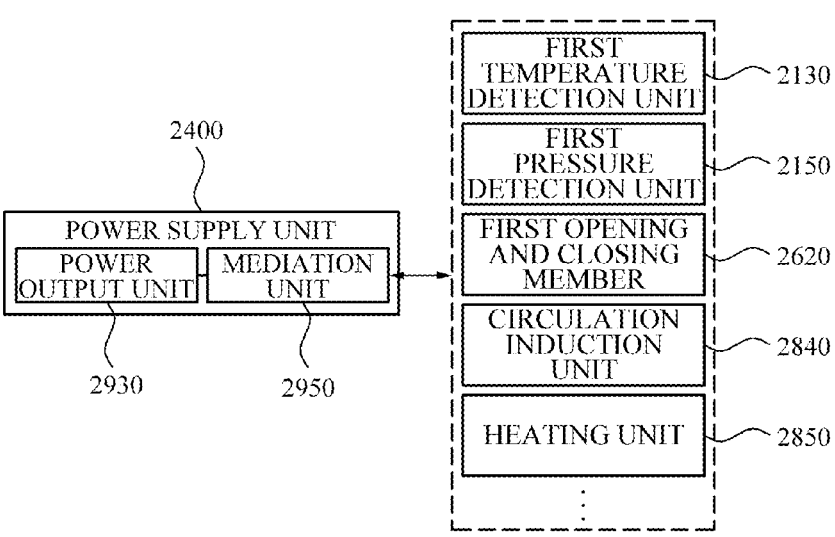
FIG. 15 is a configuration diagram showing a mediation unit of the air purification apparatus according to the first embodiment of the present specification.

FIG. 15 is a configuration diagram showing a mediation unit of the air purification apparatus according to the first embodiment of the present specification.

Referring to FIG. 15, the power supply unit 2400 may include a power output unit 2930 and a mediation unit 2950.

The power output unit 2930 may be connected to the power application configuration.

The power output unit 2930 may be connected to the power application configuration through the mediation unit 2950.

The power output unit 2930 may output power. The power output unit 2930 may supply power to any one of the power application configurations through the mediation unit 2950.

The mediation unit 2950 may be physically connected to the power application configuration and electrically connected.

When the mediation unit 2950 is heated, a state of the mediation unit 2950 may be changed. When the temperature of the mediation unit 2950 is higher than or equal to a predetermined melting temperature, a shape of at least a part of the mediation unit 2950 may be transformed into a liquid material or a fluid material corresponding to the liquid phase. In this case, the mediation unit 2950 may be the emergency temperature detection unit. Alternatively, the mediation unit 2950 may function as the emergency temperature detection unit.

In this case, the predetermined melting temperature may be higher than the predetermined emergency temperature. In other words, according to one example, when the temperature of the air purification apparatus 2000 primarily reaches the predetermined emergency temperature, the power supplied to the air purification apparatus 2000 may be adjusted based on the power cut-off signal, or the operations of the individual components of the air purification apparatus 2000 may be controlled. In addition, when the temperature of the air purification apparatus 2000 reaches the predetermined melting temperature, the mediation unit 2950 may be melted and the power supply to at least any one of the air purification apparatus 2000 may be cut off. In other words, in the emergency situation, the operations of the individual components of the air purification apparatus 2000 may be performed in a double manner.

2-2-4-3 Second Emergency Operation

Hereinafter, the second emergency mode of the air purification apparatus according to the first embodiment of the present specification will be described with reference to FIGS. 16 to 19.

FIGS. 16 to 19 are schematic diagrams showing an operation state of the air purification apparatus according to the first embodiment of the present specification in the second emergency mode.

As described above, when the air purification apparatus 2000 operates in the second emergency mode, a specific operation method may be different depending on a place where the emergency situation occurs.

The air purification apparatus 2000 may enter the second emergency mode according to a signal based on an input provided by a user or a predetermined criterion.

The control unit 2200 may acquire information on the second emergency operation according to the predetermined criterion.

The information on the second emergency operation may include the information on the place where the emergency situation occurs.

For example, when the control unit 2200 acquires high-temperature data from any one of the temperature detection units positioned within the main housing 2100 or the sub-housing 2800, the high-temperature data may be construed as including the information on the place where the emergency situation occurs in the main housing 2100.

The control unit 2200 may acquire the information on the second emergency operation without input by the user. The control unit 2200 may acquire the information on the second emergency operation based on the data on the temperature provided from at least any one of the first to fourth temperature detection units 2130, 2140, 2880, and 2890 and the emergency temperature detection unit 2190.

Alternatively, the control unit 2200 may acquire the information on the second emergency operation based on the input provided by the user. In other words, when the emergency situation occurs in an indoor area, the user may provide the information on the second emergency operation to the control unit 2200 by applying a user input to a predetermined configuration which may receive the user input.

Figure 16:
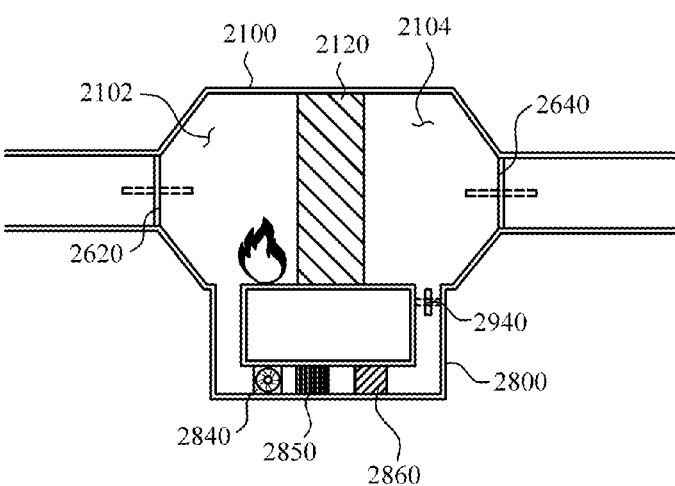
FIGS. 16 to 19 are schematic diagrams showing an operation state of the air purification apparatus according to the first embodiment of the present specification in a second emergency mode.

FIG. 16 shows the operation state of the air purification apparatus 2000 when the emergency situation occurs in the main housing 2100 or the sub housing 2800.

When the emergency situation occurs within the main housing 2100 or the sub-housing 2800 and the air purification apparatus 2000 enters the second emergency mode, the individual components of the air purification apparatus 2000 may perform the predetermined second emergency operation.

At this time, the first opening and closing member 2620 may be closed. At this time, the second opening and closing member 2640 may be closed. At this time, when the circulation induction unit 2840 is operating, the operation of the circulation induction unit 2840 may be ended.

At this time, when the heating unit 2850 is operating, the operation of the heating unit 2850 may be ended.

When both the first opening and closing member 2620 and the second opening and closing member 2640 are closed, oxygen may not be sufficiently supplied to the areas in the main housing 2100 and the sub-housing 2800, and as a result, the occurred emergency situation may be ended.

According to one example, when both the third opening and closing member 2920 and the fourth opening and closing member 2940 are included in the air purification apparatus 2000, both the third opening and closing member 2920 and the fourth opening and closing member 2940 may be closed when the air purification apparatus 2000 performs the second emergency operation. At this time, in particular, when the emergency situation occurs within the sub-housing 2800, the emergency situation occurring within the sub-housing 2800 may be ended.

Figure 17:
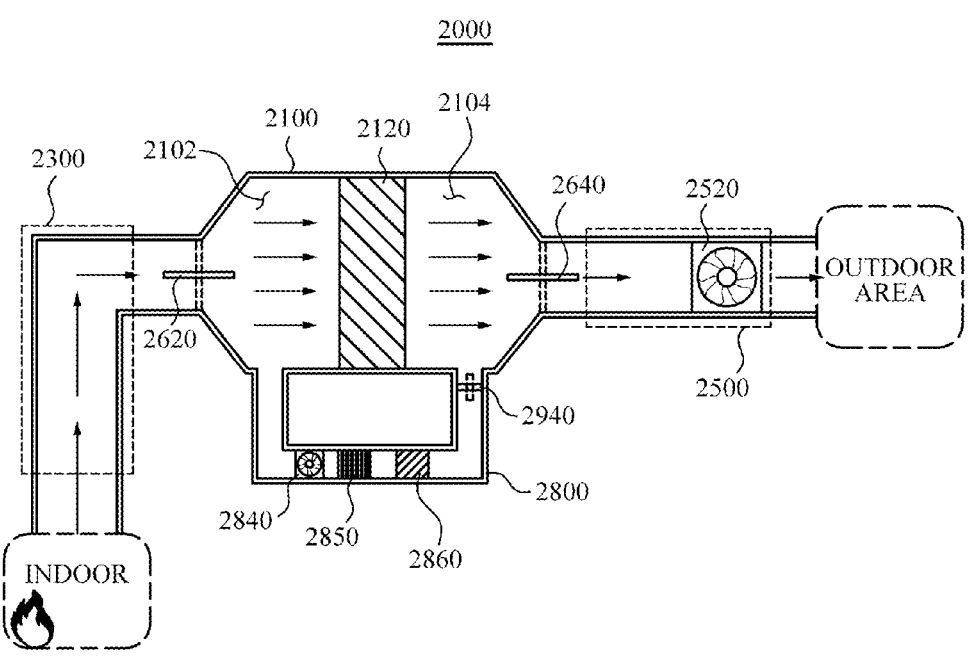
Figure 18:
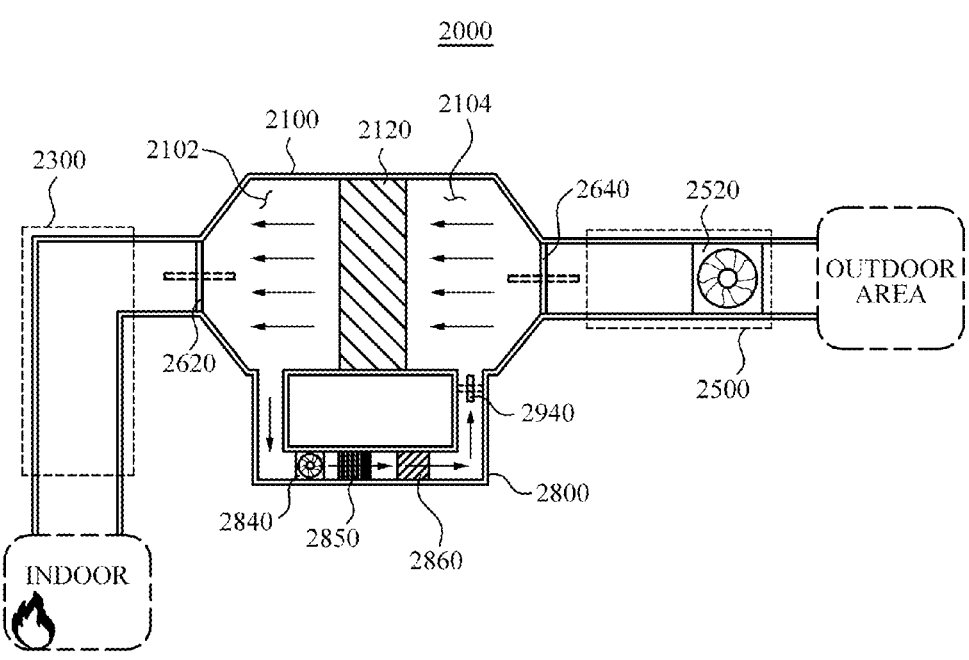
Figure 19:
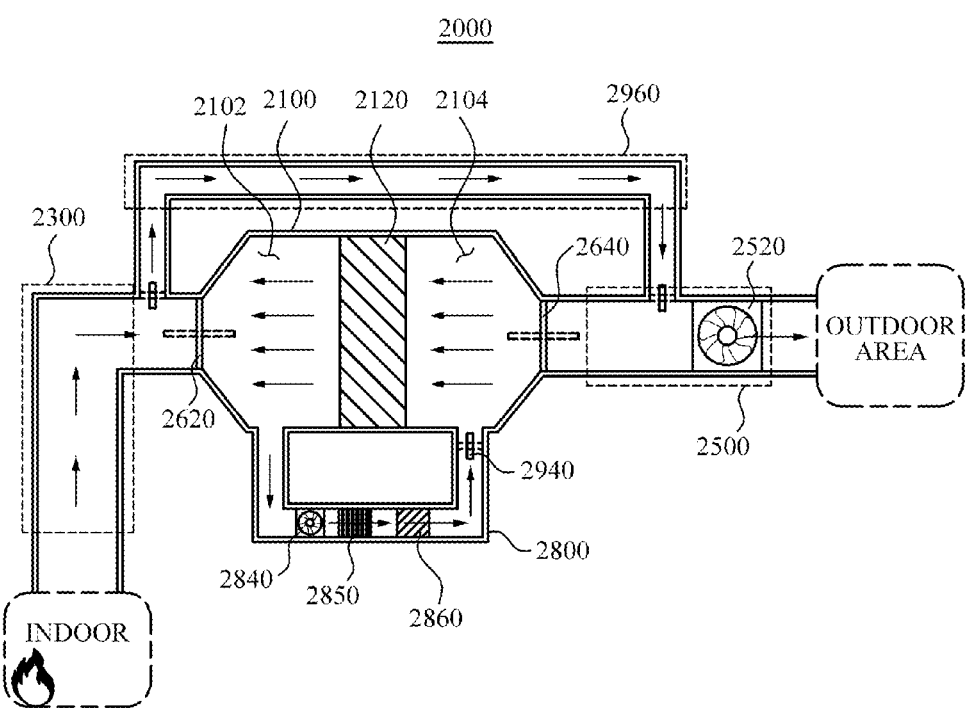

FIGS. 17 to 19 show the operation state of the air purification apparatus 2000 when the emergency situation occurs in the indoor area.

The indoor area may be fluidically connected to the inlet 2300 of the air purification apparatus 2000. An outdoor area may be fluidically connected to the outlet 2500 of the air purification apparatus 2000.

First, FIG. 17 shows the second emergency operation state when the emergency situation occurs in the indoor area while the air purification apparatus 2000 is operating in the filtering mode.

When the emergency situation occurs in the indoor area and the air purification apparatus 2000 enters the second emergency mode, the individual components of the air purification apparatus 2000 may perform the predetermined second emergency operation.

At this time, the first opening and closing member 2620 may maintain an opened state.

At this time, the second opening and closing member 2640 may maintain an opened state.

At this time, the fourth opening and closing member 2940 may maintain a closed state.

At this time, the exhaust unit 2520 may maintain the exhaust operation.

The air purification apparatus 2000 may solve an additional problem related to the emergency situation occurring in the indoor area. For example, when a fire occurs in the indoor area, fire smoke provided from the indoor area needs to be discharged to the outdoor area.

When the air purification apparatus 2000 performs the second emergency operation, the occurred fire smoke may be discharged to the outdoor area.

FIGS. 18 and 19 show the second emergency operation when the emergency situation occurs in the indoor area while the air purification apparatus 2000 is operating in the cleaning mode.

When the air purification apparatus 2000 enters the second emergency mode while operating in the cleaning mode, the individual components of the air purification apparatus 2000 may perform the predetermined second emergency operation.

At this time, the first opening and closing member 2620 may maintain a closed state.

At this time, the second opening and closing member 2640 may maintain a closed state.

An additional emergency situation which may occur in the area within the main housing 2100 or sub-housing 2800 can be prevented by maintaining the first opening and closing member 2620 and the second opening and closing member 2640 in the closed state.

The temperature within the main housing 2100 may be higher than or equal to the predetermined temperature when the air purification apparatus 2000 operates in the cleaning mode. The additional emergency situation may occur when the first opening and closing member 2620 or the second opening and closing member 2640 is opened to supply air to the inside of the main housing 2100 (more specifically, when oxygen is supplied).

At this time, the circulation operation of the circulation induction unit 2840 may be ended.

However, arrows indicating the air circulation flow are displayed to indicate that the drawings are related to the cleaning mode, and when the operation of the circulation induction unit 2840 is stopped, the intensity of the air circulation flow may be construed as weakening.

At this time, the heating operation of the heating unit 2850 may be ended.

As described above, when the emergency situation occurs in the indoor area, the problem related to the additional emergency (e.g., fire smoke) needs to be solved.

Referring to FIG. 19, the air purification apparatus 2000 may further include a bypass passage unit 2960.

The bypass passage unit 2960 may communicate with the inlet 2300 and the outlet 2500. The bypass passage unit 2960 may fluidically connect the inlet 2300 and the outlet 2500. The bypass passage unit 2960 may not directly communicate with the main housing 2100.

The bypass passage unit 2960 may discharge the air of the inlet 2300 to the outlet 2500. The bypass passage unit 2960 may discharge air to a discharge area (outdoor area in FIG. 18) even when air is not supplied to the main housing 2100.

The air purification apparatus 2000 may further include a fifth opening and closing member 2962 and a sixth opening and closing member 2964.

The fifth opening and closing member 2962 may be positioned between the inlet 2300 and the bypass passage unit 2960.

The sixth opening and closing member 2964 may be positioned between the outlet 2500 and the bypass passage unit 2960.

When the emergency situation occurs in the indoor area while the air purification apparatus 2000 further including the bypass passage unit 2960 is operating in the cleaning mode, the fifth opening and closing member 2962 and the sixth opening and closing member 2964 may be opened.

At this time, the problem related to the additional emergency situation occurring in the indoor area may be solved. For example, the fire smoke occurring in the indoor area may be discharged to the outdoor area through the bypass passage unit 2960.

However, even when only at least any one of the fifth opening and closing member 2962 and the sixth opening and closing member 2964 is included, the object of the above-described bypass passage unit 2960 may be achieved.

2-3 Example of Modified Structure

Figure 20:
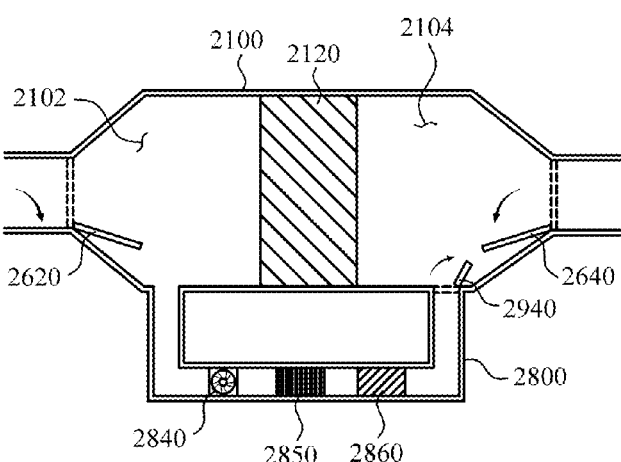
FIG. 20 is a schematic diagram showing the contents of the interference prevention between opening and closing members of the air purification apparatus according to the first embodiment of the present specification.

FIG. 20 is a schematic diagram showing the contents of the interference prevention between opening and closing members of the air purification apparatus according to the first embodiment of the present specification.

Referring to FIG. 20, operation ranges between a plurality of adjacent opening and closing members may not overlap each other.

When the air purification apparatus 2000 is switched from the cleaning mode to the filtering mode or from the filtering mode to the cleaning mode, each of the plurality of opening and closing members may be opened or closed. At this time, there is a need for the operations of the adjacent opening and closing members not to interfere with each other in the process of opening and closing the plurality of opening and closing members.

According to one example, the operation ranges of the second opening and closing member 2640 and the fourth opening and closing member 2680 may not overlap.

For example, the second opening and closing member 2640 may rotate for an opening or closing operation with respect to a second rotational axis. At this time, a range when the second opening and closing member 2640 rotates around the second rotational axis may have a first range. The fourth opening and closing member 2680 may rotate for an opening or closing operation with respect to the second rotational axis. At this time, a range when the fourth opening and closing member 2680 rotates around the second rotational axis may have a second range. The first range and the second range may at least not overlap.

Although not shown in the drawings, when an opening and closing member for the sub-housing is further included at a position corresponding to the first main area 2102, operation ranges of the first opening and closing member 2620 and the opening and closing member further included may not overlap.

Figure 21:
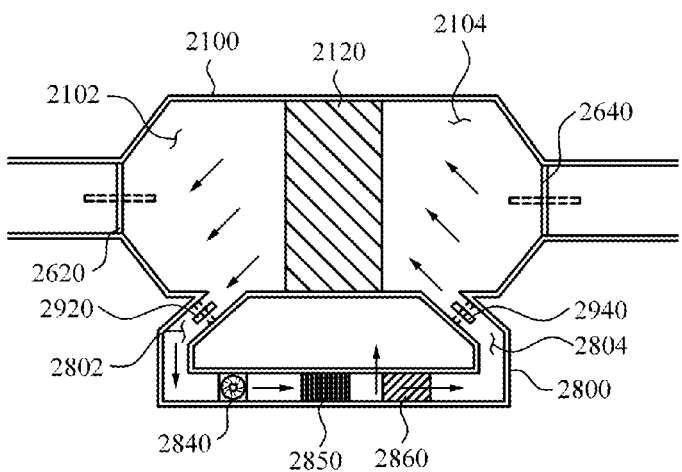
FIG. 21 is a schematic diagram showing a changed circulation flow path of the air purification apparatus according to the first embodiment of the present specification.

FIG. 21 is a schematic diagram showing a changed circulation flow path of the air purification apparatus according to the first embodiment of the present specification.

Referring to FIG. 21, at least a part of the sub-housing 2800 may be bent. The sub-housing 2800 may be bent at at least three points.

The sub-housing 2800 may include a main circulation flow path unit, the first circulation flow path unit 2802, and the second circulation flow path unit 2804.

Although not shown in the drawing, the main circulation flow path unit may refer to an area where the circulation induction unit 2840, the heating unit 2850, and the second filter unit 2860 are positioned.

The main circulation flow path unit may be fluidically connected to the first main area 2102 through the first circulation flow path unit 2802.

The main circulation flow path unit may be fluidically connected to the second main area 2104 through the second circulation flow path unit 2804.

The first circulation flow path unit 2802 may face the first filter unit 2120.

The second circulation flow path unit 2804 may face the first filter unit 2120.

A longitudinal direction of the first circulation flow path unit 2802 may be a first longitudinal direction, and a longitudinal direction of the second circulation flow path unit 2804 may be a second longitudinal direction.

An air flow path flowing in the first longitudinal direction may be provided in the first circulation flow path unit 2802. An air flow path flowing in the second longitudinal direction may be provided in the second circulation flow path unit 2804.

In this case, an extension line in the first direction and an extension line in the second direction may at least overlap. The extension line in the first direction and the extension line in the second direction may meet in an area corresponding to the area of the first filter unit 2120.

A partial area of the first circulation flow path unit 2802 may be bent. An area adjacent to the first main area 2102 of the first circulation flow path unit 2802 may be bent toward the first filter unit 2120.

An angle between the first longitudinal direction and the main air flow direction may be 90 degrees or less. In this case, the main air flow direction may be defined as a direction from the inlet 2300 toward the outlet 2500.

An angle between the first longitudinal direction and a predetermined direction of the first filter unit 2120 may be 90 degrees or less. In this case, the predetermined direction of the first filter unit 2120 may be defined as a direction of an extension line of a line connecting at least two points coming into contact with the main housing 2100 of the first filter unit 2120.

A partial area of the second circulation flow path unit 2804 may be bent. The area adjacent to the second main area 2102 of the second circulation flow path unit 2804 may be bent toward the first filter unit 2120.

An angle between the second longitudinal direction and the main air flow direction may be 90 degrees or less.

An angle between the second longitudinal direction and the predetermined direction of the first filter unit 2120 may be 90 degrees or less. In this case, the predetermined direction of the first filter unit 2120 may be defined as a direction of an extension line of a line connecting at least two points coming into contact with the main housing 2100 of the first filter unit 2120.

As a result, the air of the sub-housing 2800 may be provided to the main housing 2100 through the second circulation flow path unit 2804 and provided in a direction toward the first filter unit 2120, so that the air provided from the sub-housing 2800 may be more rapidly moved to the first filter unit 2120.

The first product may be moved from the first filter unit 2120 to the sub-housing 2800, and the first circulation flow path unit 2802 may be arranged in a direction facing the first filter unit 2120, so that the first product may be efficiently moved to the area within the sub-housing 2800.

Hereinafter, an air purification apparatus according to a second embodiment of the present specification will be described below. However, the contents that may overlap the above description will be omitted. In order to understand the content of the air purification apparatus according to the second embodiment, it may be construed in consideration of the above detailed description.

3. Second Embodiment

Hereinafter, the detailed description including the structure, operation, and the like of the air purification apparatus according to the second embodiment of the present specification will be described below with reference to FIGS. 22 to 26.

Figure 22:
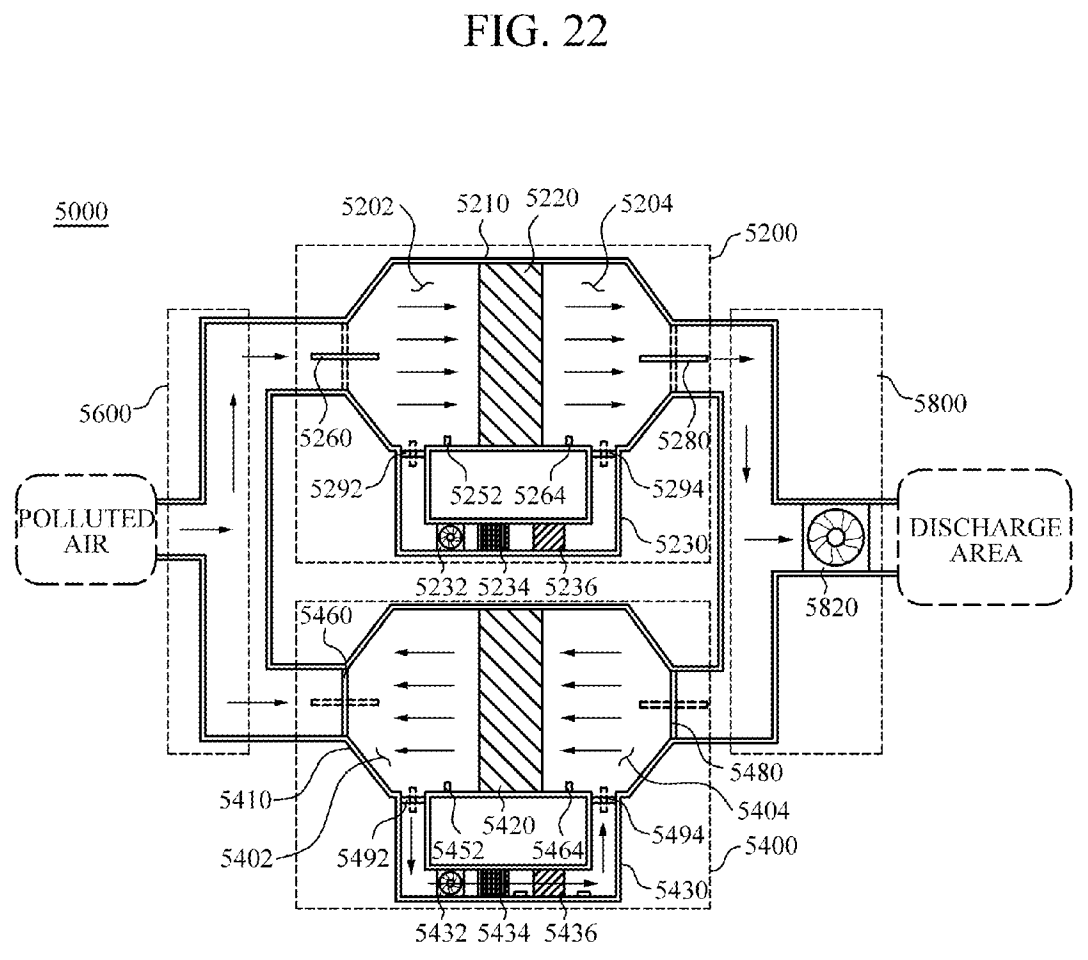

FIG. 22 is a schematic diagram showing an operation state of an air purification apparatus 5000 according to a second embodiment of the present specification.

The air purification apparatus 5000 may include at least two air purification structures.

The at least two air purification structures may include a first air purification structure 5200 and a second air purification structure 5400.

The first air purification structure 5200 and the second air purification structure 5400 may be substantially the same air purification structure.

The first air purification structure 5200 and the second air purification structure 5400 may share an inlet 5600.

The first air purification structure 5200 and the second air purification structure 5400 may share an outlet 5800.

Each of the first air purification structure 5200 and the second air purification structure 5400 may be positioned between the inlet 5600 and the outlet 5800.

The inlet 5600 may have two or more branched flow paths. One of the two or more branched flow paths may be fluidically connected to the first air purification structure 5200. The other one of the two or more branched flow paths may be fluidically connected to the second air purification structure 5400.

The air provided to the inlet 5600 may be provided to the first air purification structure 5200 or the second air purification structure 5400.

The air supplied from the first air purification structure 5200 or the second air purification structure 5400 may be discharged to the outlet 5800.

The outlet 5800 may have two or more branched flow paths. One of the two or more branched flow paths may be fluidically connected to the first air purification structure 5200.

The other one of the two or more branched flow paths may be fluidically connected to the second air purification structure 5400.

The outlet 5800 may include an exhaust unit 5820 which may discharge air to the outside.

Each of the first air purification structure 5200 and the second air purification structure 5400 may be the air purification apparatus 2000 according to the first embodiment described above.

The first main housing 5210, the first sub-housing 5230, the second main housing 5410, and the second sub-housing 5430, and the respective individual components may be substantially the same as the contents of the main housing and the individual components according to the first embodiment described above. Hereinafter, specific contents which may overlap the first embodiment will be omitted.

The first air purification structure 5200 may include the first main housing 5210 and the first sub-housing 5230.

The first air purification structure 5200 may include a first opening and closing member 5260 positioned between the first main housing 5210 and the inlet 5300 and a second opening and closing member 5280 positioned between the first main housing 5210 and the outlet 5800.

The first main housing 5210 may include a first main filter unit 5220, a first measurement unit 5252, and a second measurement unit 5264.

The first measurement unit 5252 may be positioned in a first main area 5202. The first main area 5202 may be positioned between the first opening and closing member 5260 and the first main filter unit 5220.

The first measurement unit 5252 may acquire data on at least any one of pressure data, temperature data, an air flow velocity, an air pressure, and an air flow rate of the first main area 5202. The first measurement unit 5252 may correspond to the first temperature detection unit 2130 and the first pressure detection unit 2150 described above with reference to the air purification apparatus according to the first embodiment.

The second measurement unit 5264 may be positioned in a second main area 5204. The second main area 5204 may be positioned between the second opening and closing member 5280 and the first main filter unit 5220.

The second measurement unit 5264 may acquire data on at least any one of pressure data, temperature data, an air flow velocity, an air pressure, and an air flow rate of the second main area 5204. The second measurement unit 5264 may correspond to the second temperature detection unit 2140 and the second pressure detection unit 2160 described above with reference to the air purification apparatus according to the first embodiment.

The first sub-housing 5230 may include a fifth opening and closing member 5292, a sixth opening and closing member 5294, a first circulation induction unit 5322, a first heating unit 5234, and a first sub-filter unit 5236.

The second air purification structure 5200 may include the second main housing 5410 and the second sub-housing 5430.

The second air purification structure 5400 may include a third opening and closing member 5460 positioned between the second main housing 5410 and the inlet 5300 and a fourth opening and closing member 5480 positioned between the second main housing 5410 and the outlet 5800.

The second main housing 5410 may include a second main filter unit 5420, a third measurement unit 5452, and a fourth measurement unit 5464.

The third measurement unit 5452 may be positioned in a third main area 5402. The third main area 5402 may be positioned between the third opening and closing member 5460 and the second main filter unit 5420.

The third measurement unit 5452 may acquire data on at least any one of pressure data, temperature data, an air flow velocity, an air pressure, and an air flow rate of the third main area 5402. The third measurement unit 5452 may correspond to the first temperature detection unit 2130 and the first pressure detection unit 2150 described above with reference to the air purification apparatus according to the first embodiment.

The fourth measurement unit 5464 may be positioned in a fourth main area 5404. The fourth main area 5404 may be positioned between the fourth opening and closing member 5480 and the second main filter unit 5420.

The fourth measurement unit 5464 may acquire data on at least any one of pressure data, temperature data, an air flow velocity, an air pressure, and an air flow rate of the fourth main area 5404. The fourth measurement unit 5464 may correspond to the second temperature detection unit 2140 and the second pressure detection unit 2160 described above with reference to the air purification apparatus according to the first embodiment.

The second sub-housing 5430 may include a seventh opening and closing member 5492, a sixth opening and closing member 5494, a second circulation induction unit 5432, a second heating unit 5434, and a second sub-filter unit 5436.

When the air purification apparatus 5000 operates in the filtering mode, at least any one of the first air purification structure 5200 and the second air purification structure 5400 may perform the filtering operation.

When the air purification apparatus 5000 operates in the cleaning mode, at least any one of the first air purification structure 5200 and the second air purification structure 5400 may perform the cleaning operation.

At least one of the first air purification structure 5200 and the second air purification structure 5400 may need to operate in the filtering mode.

The first air purification structure 5200 may perform the filtering operation, and the second air purification structure 5400 may perform the cleaning operation (See FIG. 22). Alternatively, although not shown in the drawing, the first air purification structure 5200 may perform the cleaning operation, and the second air purification structure 5400 may perform the filtering operation.

The air purification apparatus 5000 may operate in a filtering mode or a cleaning mode based on filter abnormality information on the air purification apparatus 5000.

The control unit 2200 may acquire filter state information on the first air purification structure 5200. The control unit 2200 may determine the filter state information based on the state information on the first air purification structure 5200.

The control unit 2200 may determine the filter state information on the first air purification structure 5200 based on data on the first main area 5202 provided from the first measurement unit 5252 and data on the second main area 5204 provided from the second measurement unit 5264.

The control unit 2200 may acquire the filter state information on the second air purification structure 5400. The control unit 2200 may determine the filter state information based on the state information on the second air purification structure 5400.

In this case, the filter state information may include the state abnormality information. (The filter state information may correspond to the content of the first filter abnormality information described above with reference to the first embodiment). The air purification structure having the state abnormality information may not have higher filtering efficiency than predetermined efficiency.

Figure 23:
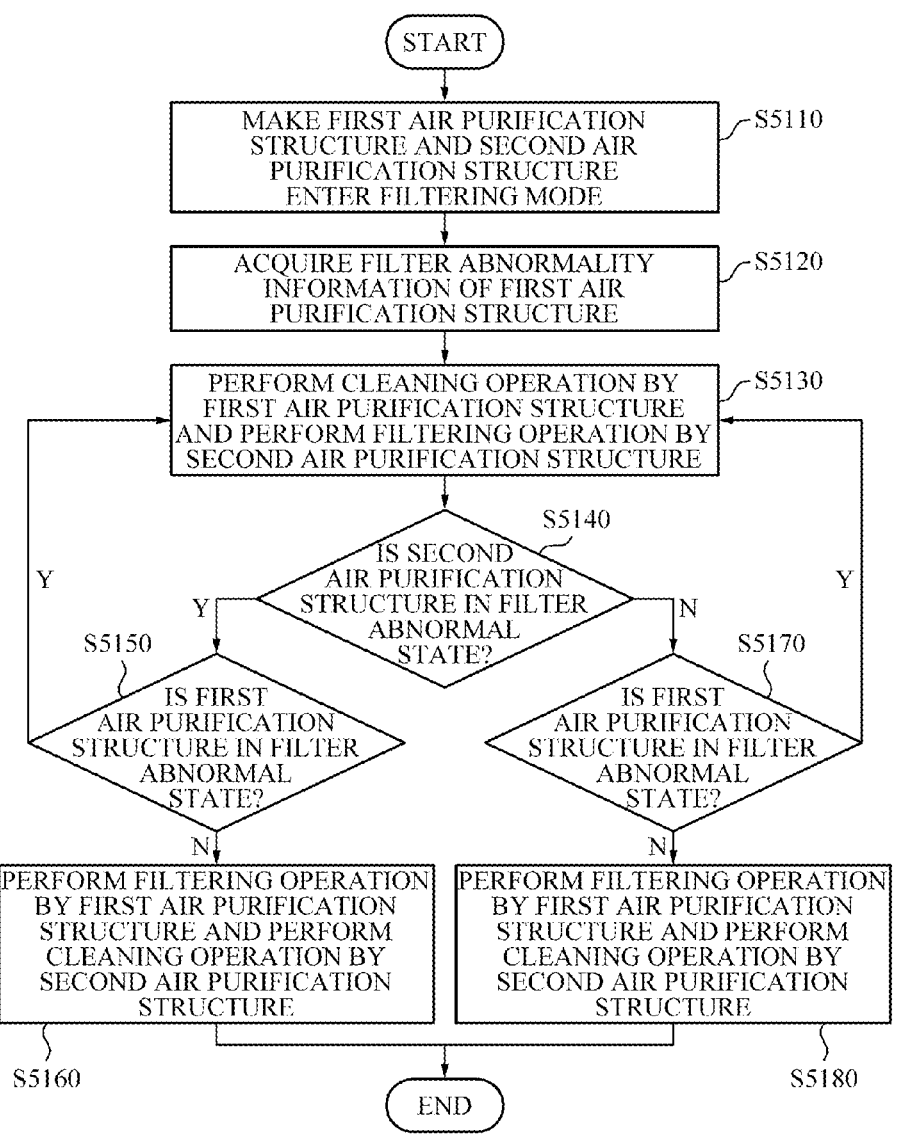
FIG. 23 is a flowchart showing a method of operating a plurality of air purification structures of the air purification apparatus according to the second embodiment of the present specification.

FIG. 23 is a flowchart showing a method of operating a plurality of air purification structures of the air purification apparatus according to the second embodiment of the present specification.

Referring to FIG. 23, the method may include an operation of making the first air purification structure and the second air purification structure enter the filtering mode (S5110), an operation of acquiring the filter abnormality information on the first air purification structure (S5120), an operation of performing the cleaning operation by the first air purification structure and performing the filtering operation by the second air purification structure (S5130), an operation of determining the filter abnormality state by the second air purification structure (S5140), an operation of determining the filter abnormality state by the first air purification structure (S5150), an operation of performing the filtering operation by the first air purification structure and performing the cleaning operation by the second air purification structure (S5160), an operation of determining the filter abnormality state by the first air purification structure (S5170), and an operation of performing the filtering operation by the first air purification structure and performing the filtering operation by the second air purification structure (S5180).

In the operation of making the first air purification structure 5200 and the second air purification structure 5400 enter the filtering mode (S5110), the first air purification structure

5200 and the second air purification structure 5400 may perform the filtering operation.

The operation of acquiring the filter abnormality information on the first air purification structure 5200 (S5120) may be performed. In the present specification, the filter abnormality information may be referred to as state abnormality information.

In the operation of acquiring (S5120), the control unit 2200 may acquire the state information on the first air purification structure 5200 and the second air purification structure 5400. In this case, the state information may include pressure data, temperature data, an air flow velocity, an air pressure, and an air flow rate.

The control unit 2200 may acquire the state abnormality information for the first air purification structure 5200 based on the state information.

When a difference between a pressure of the first main area 5202 and a pressure of the second main area 5204 is higher than or equal to a predetermined differential pressure, the control unit 2200 may acquire the state abnormality information on the first air purification structure 5200.

When a flow velocity in the first main area 5202 is lower than or equal to a predetermined flow velocity, the control unit 2200 may acquire the state abnormality information on the first air purification structure 5200.

The control unit 2200 may acquire the state abnormality information on the first air purification structure 5200 based on the flow velocity of the first main area 5202 and the flow velocity of the third main area 5402.

For example, when a difference between the flow velocity in the first main area 5202 and the flow velocity in the third main area 5402 is smaller than a predetermined flow velocity difference value, the control unit 2200 may determine that the first main filter unit 5220 is in an abnormal state.

When the difference between the flow rate in the first main area 5202 and the flow rate in the third main area 5402 is smaller than a predetermined flow rate difference, the control unit 2200 may acquire the state abnormality information on the first air purification structure 5200.

After the operation of acquiring (S5120), the operation of performing the cleaning operation by the first air purification structure 5200 and performing the filtering operation by the second air purification structure 5400 (S5130) may be performed.

Although not shown in the drawing, in the operation of acquiring (S5120), the state abnormality information on the first air purification structure 5200 and the state abnormality information on the second air purification structure 5400 may be acquired.

At this time, the control unit 2200 may acquire first state abnormality information indicating that the first air purification structure 5200 has first abnormal operation efficiency. The control unit 2200 may acquire second state abnormality information indicating that the second air purification structure 5400 has second abnormal operation efficiency.

At this time, when the first abnormal operation efficiency is lower than the second abnormal operation efficiency, the control unit 2200 may control the first air purification structure 5200 to operate in the filtering mode and control the second air purification structure 5400 to operate in the cleaning mode.

Alternatively, when the first abnormal operation efficiency is higher than the second abnormal operation efficiency, the control unit 2200 may control the first air purification structure 5200 to operate in the cleaning mode and control the second air purification structure 5400 to operate in the filtering mode.

As a result, when both the first air purification structure 5200 and the second air purification structure 5400 are in the filter abnormality state, the air purification structure having relatively high filter efficiency may be preferentially cleaned.

After the operation of performing (S5130) or while the operation of performing (S5130) is performed, the operation of determining whether the second air purification structure 5400 is in the filter abnormality state (S5140) may be performed.

In the operation of determining (S5140), when a difference between a pressure of the third main area 5402 and a pressure of the fourth main area 5404 is greater than or equal to a predetermined difference, it may be determined that the second air purification structure 5400 is in the abnormal state.

Alternatively, when the flow velocity in the third main area 5402 is lower than a predetermined flow velocity, it may be determined that the second air purification structure 5400 is in the abnormal state.

Alternatively, it may be determined that the second air purification structure 5400 is in the abnormal state based on the state information on the first main area 5202 and the state information on the third main area 5402.

At this time, the control unit 2200 may acquire the state abnormality information on the second air purification structure 5400.

When it is determined that the second air purification structure 5400 is in the filter abnormality state, the operation of determining whether the first air purification structure 5200 is in the filter abnormality state (S5150) may be performed.

Whether the first air purification structure 5200 is in the filter abnormality state may be determined in the same manner as in the operation of acquiring (S5120) or the operation of determining whether the second air purification structure is in the filter abnormality state (S5140).

When it is determined that the first air purification structure 5200 is in the filter abnormality state, the operation of performing (S5130) may be performed again. In other words, the second air purification structure 5400 may operate in the filtering mode at least until the cleaning of the first air purification structure 5200 is completed.

However, although not shown in the drawing, even when it is determined that the first air purification structure 5200 is in the filter abnormality state having the abnormal operation efficiency in the operation of determining whether the first air purification structure 5200 is in the filter abnormality state (S5150), the operation of performing the filtering operation by the first air purification structure 5200 and performing the cleaning operation by the second air purification structure 5400 (S5160) may be performed when the second air purification structure 5400 is in an emergency operation state having emergency operation efficiency. In this case, the abnormal operation efficiency may be higher than the emergency operation efficiency. In other words, when any one of the air purification structures operating in the filtering mode does not have operation performance higher than or equal to the predetermined efficiency, the air purification structure under cleaning operates in the filtering mode, and the air purification structure which does not have operation performance higher than or equal to the predetermined efficiency may enter the cleaning mode.

Meanwhile, although not shown in the drawing, when the air purification apparatus 5000 further includes a bypass passage unit, the bypass passage unit may be opened when it is determined that both the first air purification structure

5200 and the second air purification structure 5400 are in the filter abnormality state. Since the structure and function of the bypass passage unit will be described below with reference to FIG. 26, a detailed description will be omitted.

When it is determined that the first air purification structure 5200 is not in the filter abnormality state, the operation of performing the filtering operation by the first air purification structure 5200 and performing the cleaning operation by the second air purification structure 5400 (S5160) may be performed.

As a result, the first air purification structure 5200 which has been cleaned may enter the filtering mode, and the second air purification structure 5400 which requires cleaning may enter the cleaning mode.

Meanwhile, when it is determined that the second air purification structure 5400 is not in the filter abnormality state in the operation of determining whether the second air purification structure is in the filter abnormality state (S5140), the operation of determining whether the first air purification structure 5200 is in the filter abnormality state (S5170) may be performed.

As in the operation of determining (S5150), whether the first air purification structure 5200 is in the filter abnormality state may be determined in the same manner as in the operation of acquiring (S5120) or the operation of determining whether the second air purification structure is in the filter abnormality state (S5140).

When it is determined that the first air purification structure 5200 is in the filter abnormality state, the operation of performing (S5130) may be performed again. In other words, the first air purification structure 5200 which requires cleaning may perform the cleaning operation again, and the second air purification structure 5400 which does not relatively require the cleaning may continue to perform the filtering operation.

When it is determined that the first air purification structure 5200 is not in the filter abnormality state in the operation of determining (S5170), the operation of performing the filtering operation by the first air purification structure 5200 and the second air purification structure 5400 (S5180) may be performed.

In other words, since it is determined that the first air purification structure 5200 and the second air purification structure 5400 are not in the filter abnormality state through the above-described operations, the first and second air purification structures 5200 and 5400 may perform the filtering operation.

As a result, according to the embodiment, at least any one of the first air purification structure 5200 and the second air purification structure 5400 may operate in the filtering mode.

Figure 24:
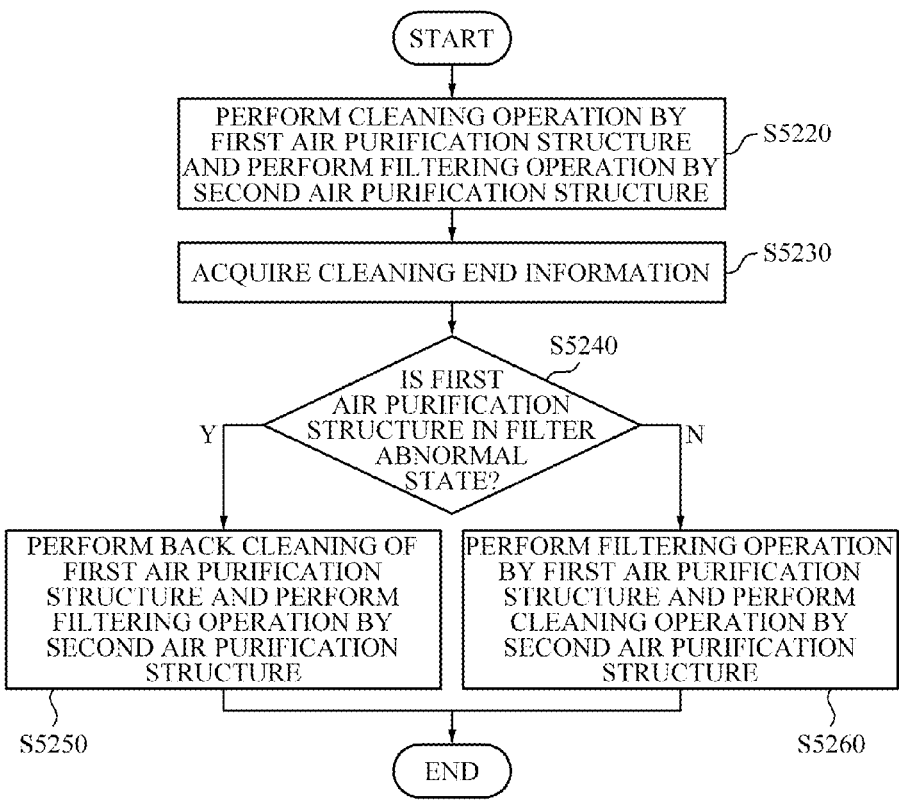
FIG. 24 is a flowchart showing an operation related to a cleaning mode of the air purification apparatus (5000) according to the second embodiment of the present specification.

FIG. 24 is a flowchart showing an operation related to a cleaning mode of the air purification apparatus 5000 according to the second embodiment of the present specification.

Referring to FIG. 24, the operation method related to the cleaning mode of the air purification apparatus 5000 may include an operation of performing the cleaning operation by the first air purification structure 5200 and performing the filtering operation by the second air purification structure 5400 (S5220), an operation of acquiring a cleaning end signal (S5230), an operation of determining whether the first air purification structure is in the filter abnormality state (S5240), an operation of performing a back cleaning of the first air purification structure and performing the filtering operation by the second air purification structure (S5250), and an operation of performing the filtering operation by the first air purification structure and performing the cleaning operation by the second air purification structure (S5260).

The first air purification structure 5200 may perform the cleaning operation, and the second air purification structure 5400 may perform the filtering operation.

After the operation of performing (S5220) or while the operation of performing (S5220) is performed, the operation of acquiring the cleaning end signal (S5230) may be performed.

As described above with reference to the air purification apparatus according to the first embodiment, the control unit 2200 may acquire cleaning end information according to a predetermined criterion.

In this case, according to one example, the cleaning end information may not mean that the cleaning of the air purification structure has been completely ended but mean that the cleaning mode will be formally ended according to the predetermined criterion.

For example, the control unit 2200 may acquire cleaning end information after a predetermined time has elapsed since the air purification apparatus 5000 entered the cleaning mode.

In the operation of determining whether the first air purification structure 5200 is in the filter abnormality state (S5240), it may be determined whether the operation ability of the first air purification structure 5200 is lowered.

Whether the first air purification structure 5200 is in the filter abnormality state may be determined in the same manner as in the operation of acquiring (S5120) or the operation of determining whether the second air purification structure 5200 is in the filter abnormality state (S5140) described above with reference to FIG. 23.

When it is determined that the first air purification structure 5200 is in the filter abnormality state, the operation of performing the back cleaning of the first air purification structure 5200 and performing the filtering operation by the second air purification structure (S5250) may be performed.

In this case, the back cleaning may refer to the high-pressure cleaning described above. In other words, when the first air purification structure 5200 is in the filter abnormality state even when it has been cleaned, it may be determined that the high-pressure cleaning operation of the first air purification structure 5200 is required.

In this case, at least any one of the first air purification structure 5200 and the second air purification structure 5400 needs to operate in the filtering mode. As a result, the second air purification structure 5400 may operate in the filtering mode at least while the back cleaning of the first air purification structure 5200 is performed.

When it is determined that the first air purification structure 5200 is not in the filter abnormality state in the operation of determining (S5240), the operation of performing the filtering operation by the first air purification structure and performing the cleaning operation by the second air purification structure 5400 (S5260) may be performed.

At this time, the control unit 2200 may determine that the cleaning of the first air purification structure 5200 has been completed.

At this time, the control unit 2200 may output information indicating that the cleaning of the first air purification structure 5200 has been completed, and based on the information, the communication unit 2600 may transmit to the main server 1000 or the user terminal 3000 information including the information indicating that the cleaning of the first air purification structure 5200 has been completed.

At this time, the second air purification structure 5400 may enter the cleaning mode and enter the cleaning mode at least after the first air purification structure 5200 enters the filtering mode. In other words, at least any one of the first air purification structure 5200 and the second air purification structure 5400 may operate in the filtering mode.

Figure 25:
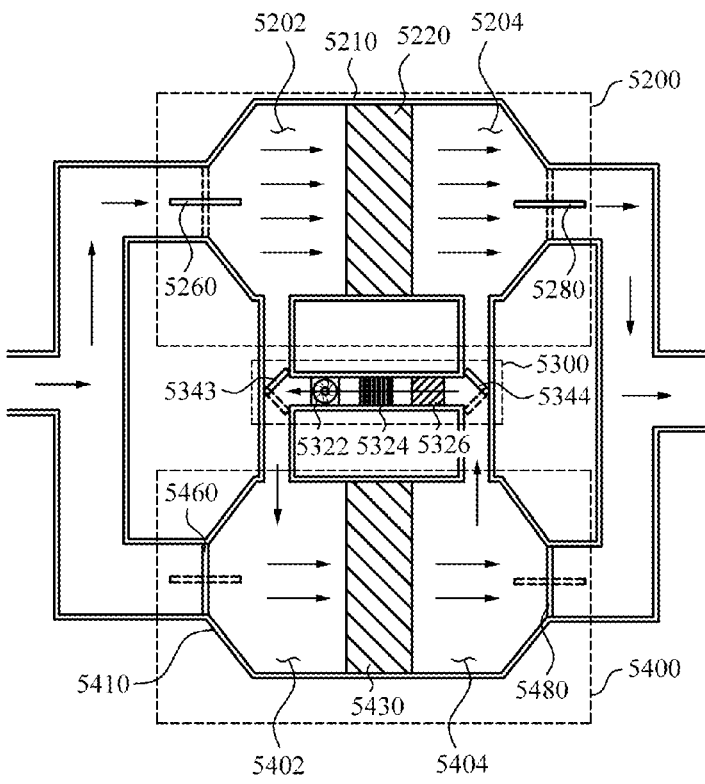
FIG. 25 is a schematic diagram of a structure of a shared sub-housing of the air purification apparatus (5000) according to the second embodiment of the present specification.

FIG. 25 is a schematic diagram of a structure of a shared sub-housing of the air purification apparatus 5000 according to the second embodiment of the present specification.

Referring to FIG. 25, the first air purification structure 5200 may share a shared sub-housing 5300 with the second air purification structure 5400.

The shared sub-housing 5300 may be positioned between the first air purification structure 5200 and the second air purification structure 5400.

The shared sub-housing 5300 may fluidically connect front and rear areas of the first main filter unit 5220. The shared sub-housing 5300 may communicate with the first main area 5202 and the second main area 5204. The shared sub-housing 5300 may fluidically connect the front and rear areas of the second main filter unit 5430. The shared sub-housing 5300 may communicate with the third main area 5402 and the fourth main area 5404.

The shared sub-housing 5300 may perform a function of the sub-housing of the first air purification structure 5200 (which may refer to the functions and features of the sub-housing 2800 and individual components described above with reference to the first embodiment) and perform a function of the sub-housing of the second air purification structure 5400.

The shared sub-housing 5300 may include a tenth opening and closing member 5343 and a eleventh opening and closing member 5344.

The tenth opening and closing member 5343 may selectively open and close the first main area 5202 or the third main area 5402. The tenth opening and closing member 5343 may open or close an area communicating with the first main area 5202. The tenth opening and closing member 5343 may open or close an area communicating with the third main area 5402.

The eleventh opening and closing member 5344 may selectively open and close the second main area 5204 or the fourth main area 5404. The eleventh opening and closing member 5344 may open or close an area communicating with the second main area 5204. The eleventh opening and closing member 5344 may open or close an area communicating with the fourth main area 5404.

The first air purification structure 5200 may operate in the filtering mode, and the second air purification structure 5400 may operate in the cleaning mode.

For example, the tenth opening and closing member 5343 may close a flow path in the first main area 5202, and the eleventh opening and closing member 5344 may close a flow path in the second main area 5204 (See FIG. 25).

At this time, the first air purification structure 5200 may operate in the filtering mode.

At this time, a predetermined circulation path (arrow) may be acquired for the second air purification structure 5400, and the second air purification structure 5400 may enter the cleaning mode.

Alternatively, both the first air purification structure 5200 and the second air purification structure 5400 may operate in the filtering mode or may operate in the cleaning mode.

Figure 26:
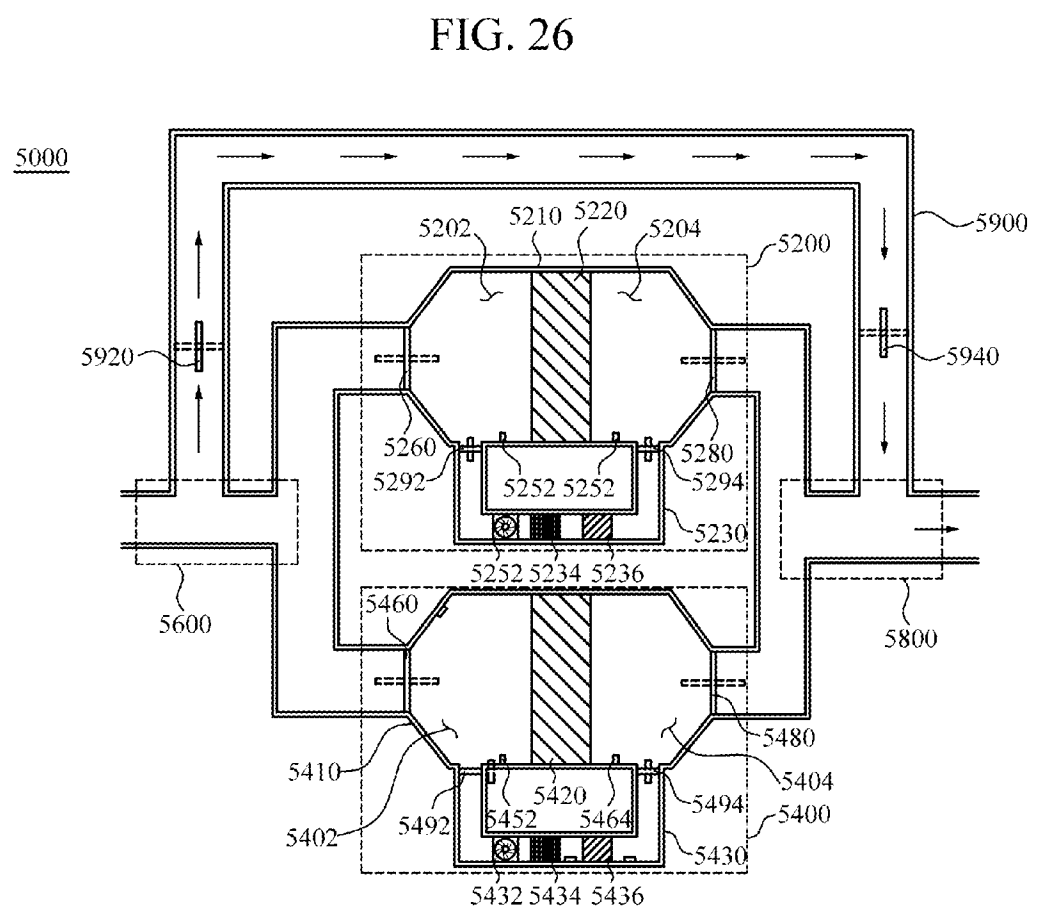

FIG. 26 is a schematic diagram of a shared structure of the bypass passage unit of the air purification apparatus 5000 according to the second embodiment of the present specification.

Referring to FIG. 26, the air purification apparatus 5000 may further include a shared bypass passage unit 5900.

The shared bypass passage unit 5900 may fluidically connect the inlet 5600 and the outlet 5800. The shared bypass passage unit 5900 may not directly communicate with the first air purification structure 5200 and the second air purification structure 5400.

The shared bypass passage unit 5900 may include an eleventh opening and closing member 5920 and a twelfth opening and closing member 5940.

However, although not shown in the drawing, in the shared bypass passage unit 5900, any one of the eleventh opening and closing member 5920 and the twelfth opening and closing member 5940 may be removed.

The shared bypass passage unit 5900 may function as an air flow path from the inlet 5600 to the outlet 5800 even when the flow path of the first air purification structure 5200 or the second air purification structure 5400 is closed (as shown in FIG. 25).

The function of the bypass passage unit may be substantially the same as the function of the bypass passage unit 2960 described above with reference to FIG. 19.

Hereinafter, an air purification apparatus according to a third embodiment of the present specification will be described below. However, the contents that may overlap the above description will be omitted. In order to understand the content of the air purification apparatus according to the third embodiment, it may be construed in consideration of the above detailed description.

4. Third Embodiment

Hereinafter, detailed contents including the structure and operation of the air purification apparatus according to the third embodiment of the present specification will be described with reference to FIGS. 27 to 29.

Figure 27:
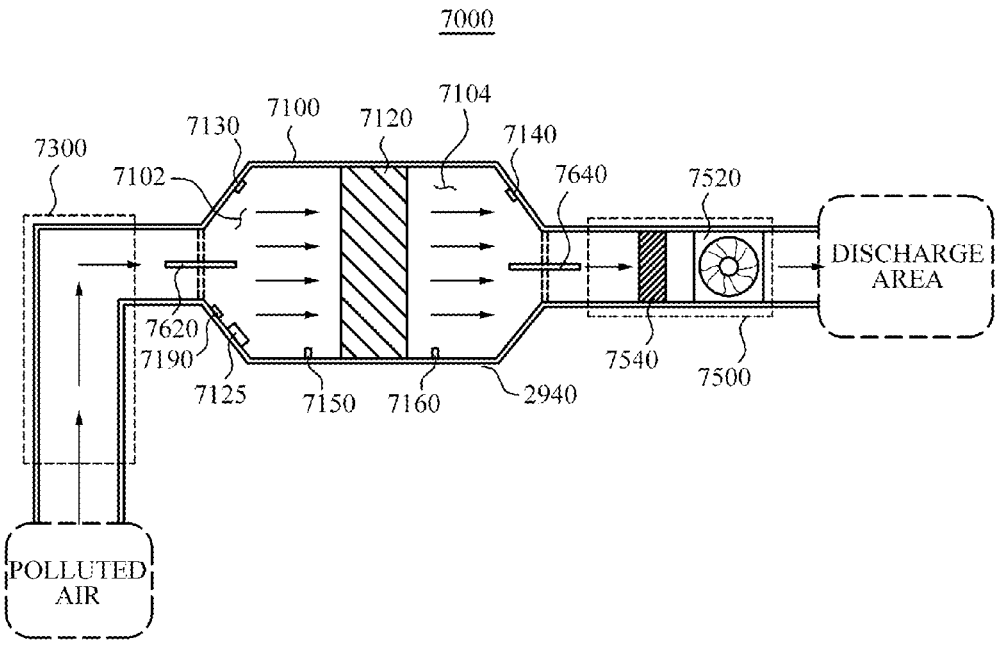
FIG. 27 is a schematic diagram showing an operation state of an air purification apparatus (7000) according to a third embodiment of the present specification.

FIG. 27 is a schematic diagram showing an operation state of an air purification apparatus 7000 according to a third embodiment of the present specification.

The air purification apparatus according to the third embodiment of the present specification may not include a sub-pipe unlike the air purification apparatus according to the first embodiment described above.

The air purification apparatus 7000 may include a first main housing 7100, an inlet 7300, and an outlet 7500.

The first main housing 7100 may include a first filter unit 7120, a first temperature detection unit 7130, a second temperature detection unit 7140, a first pressure detection unit 7150, a second pressure detection unit 7160, a heating unit 7125, and an emergency temperature detection unit 7190.

The air purification apparatus 7000 may include a first opening and closing member 7620 and a second opening and closing member 7640.

The outlet 7500 may include an exhaust unit 7520 and an adsorption unit 7540.

The first main housing 7100, the inlet 7300, the outlet 7500 and the respective individual components may be substantially the same as the contents of the main housing, the inlet, the outlet, and the individual components according to the first or second embodiment described above. Hereinafter, detailed contents which may overlap the first or second embodiment will be omitted.

The heating unit 7125 may be positioned in the main housing 7100.

According to one example, the heating unit 7125 may be positioned in the first main area 7102, and the first main area 7102 may be positioned between the first opening and closing member 7620 and the first filter unit 7120.

Alternatively, according to another example, the heating unit 7125 may be positioned in the second main area 7104, and the second main area 7104 may be positioned between the second opening and closing member 7640 and the first filter unit 7120.

Figure 28:
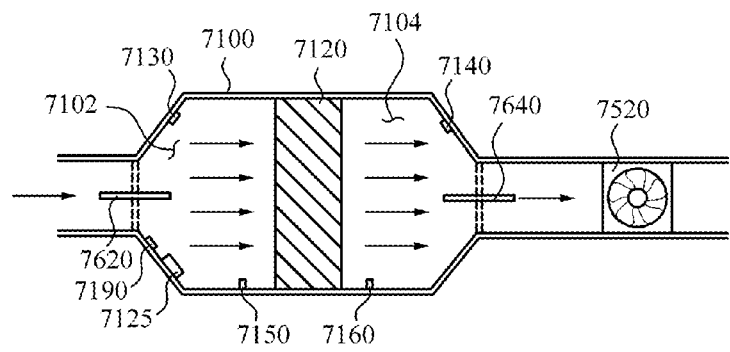
FIG. 28 is a schematic diagram of the air purification apparatus according to the third embodiment of the present specification, and a schematic diagram of the air purification apparatus operating in a filtering mode.

FIG. 28 is a schematic diagram of the air purification apparatus according to the third embodiment of the present specification, and a schematic diagram of the air purification apparatus operating in the filtering mode.

Referring to FIG. 28, the air purification apparatus 7000 may operate in the filtering mode. When the air purification apparatus 7000 enters the filtering mode, individual components of the air purification apparatus 7000 may perform a predetermined filtering operation.

Figure 29:
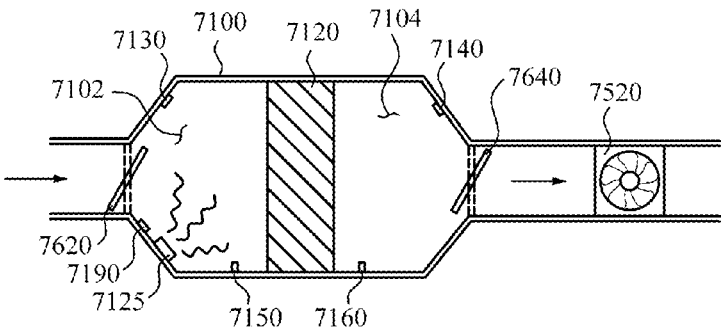
FIG. 29 is a schematic diagram of the air purification apparatus according to the third embodiment of the present specification, and a schematic diagram of the air purification apparatus operating in a cleaning mode.

FIG. 29 is a schematic diagram of the air purification apparatus according to the third embodiment of the present specification, and a schematic diagram of the air purification apparatus operating in the cleaning mode.

Referring to FIG. 29, the air purification apparatus 7000 may operate in the cleaning mode. When the air purification apparatus 7000 enters the cleaning mode, the individual components of the air purification apparatus 7000 may perform a predetermined cleaning operation.

The heating unit 7125 may emit heat. The heating unit 7125 may increase a temperature of the first filter unit 7120.

According to one example, the heating unit 7125 may be implemented by an electric heater, microwave, or a direct flame spraying method.

In this case, at least one of the first opening and closing member 7620 and the second opening and closing member 7640 may be opened. The first opening and closing member 7620 may be less closed than a fully closed state and less opened than a fully opened state.

At this time, the exhaust unit 7520 may operate to generate an air flow in a predetermined direction.

For example, when the control unit 7125 is positioned in the first main area 7102 (as shown in FIG. 28), the exhaust unit 7520 may induce the air flow from the inlet 7300 toward the outlet 7500. In this case, the heat output from the heating unit 7125 may be more efficiently diffused to the first filter unit 7120. In addition, oxygen may be supplied to the first filter unit 7120 so that a reaction to contaminants of the first filter unit 7120 heated by the heating unit 7125 may occur.

Alternatively, although not shown in the drawing, when the control unit 7124 is positioned in the second main area 7104, the exhaust unit 7520 may induce the air flow from the outlet 7500 to the inlet 7300.

The heating unit 7620 may be positioned on an inclined surface of the first main area 7102. When a virtual line extends in a first normal direction from a point where the heating unit 7620 is positioned, the virtual line may pass through the first filter unit 7120. In this case, when the heating unit 7125 emits heat, the emitted heat may be directed toward the first filter unit 7120.

Similar to when the heating unit 7102 is positioned in the first main area 7102, the heating unit 7620 may be positioned on an inclined surface of the second main area 7104. When a virtual line extends in a second normal direction from a point where the heating unit 7620 is positioned, the virtual line may pass through the first filter unit 7120. In this case, when the heating unit 7125 emits heat, the emitted heat may be directed toward the first filter unit 7120.

The methods according to the embodiments of the present invention described above may be used alone or in combination with each other. Since the respective operations described in the method according to the embodiments of the present invention are not essential, the respective methods may be performed including all of the operations as well as including only some of them. In addition, since the order in which the respective operations are described is only for convenience of description, the respective operations in the method described in the present invention do not necessarily have to be performed in the described order.

The above description is merely illustrative of the technical spirit of the present invention, and various modifications and variations will be possible without departing from the essential characteristics of the present invention by those skilled in the art to which the present invention pertains. Accordingly, the embodiments of the present invention described above may be implemented separately or in combination with each other.

Accordingly, the embodiments disclosed in the present invention are not intended to limit the technical spirit of the present invention, and to describe it, and the scope of the technical spirit of the present invention is not limited by these embodiments. The scope of the present invention should be construed by the appended claims, and all technical spirits within the equivalent range should be construed as being included in the scope of the present invention.

The invention claimed is:

1. An air purification apparatus for purifying and discharging polluted air, comprising:

a first flow path which is a movement path of air;

a second flow path which is a movement path of the air;

a main pipe including a first filter positioned between the first flow path and the second flow path and configured to collect at least some of contaminants contained in the air, a first main area positioned between the first flow path and the first filter, and a second main area positioned between the second flow path and the first filter; and a control unit configured to control the air purification apparatus to operate in the filtering mode or the cleaning mode, wherein the air purification apparatus operates in a filtering mode in which at least some of the contaminants contained in the air introduced into the main pipe are collected in the first filter or a cleaning mode in which at least some of the contaminants collected in the first filter in the filtering mode are removed, wherein an operation section of the air purification apparatus in the cleaning mode includes a first section and a second section, and the first section and the second section are divided with respect to a first division time point, wherein a temperature change rate in the first main area is changed before and after the first division time point, and wherein the control unit determines that the cleaning of the air purification apparatus has been started as a temperature of the first main area is higher than a temperature of the second main area, and determines that the cleaning of the air purification apparatus has been completed as the temperature of the first main area is lower than the temperature of the second main area.

2. The air purification apparatus of claim 1, wherein the first section has a first instantaneous temperature increase rate at an entry time point of the first division time point, the second section has a second instantaneous temperature increase rate at an end time point of the first division time point, and the first instantaneous temperature increase rate is smaller than the second instantaneous temperature increase rate.

3. The air purification apparatus of claim 1, wherein the first section includes a first division adjacent section, the second section includes a second division adjacent section, the first division adjacent section and the second division adjacent section have the same time range, and an average temperature increase rate of the first main area in the first division adjacent section is smaller than an average temperature increase rate of the first main area in the second division adjacent section.

4. The air purification apparatus of claim 1, wherein the first filter is coated with a first catalyst which mediates a reaction to the contaminants, and the first division time point is after a time point when a reaction based on the first catalyst starts.

5. The air purification apparatus of claim 1, wherein when the air purification apparatus operates in the cleaning mode, with respect to the air flow within the main pipe, the second main area is positioned upstream of the first filter, and the first main area is positioned downstream of the first filter.

6. The air purification apparatus of claim 1, wherein the air introduced from the first flow path is discharged through the second flow path, and at least some of the contaminants included in the introduced air are collected in the first filter as they move from the first main area to the second main area.

7. The air purification apparatus of claim 1, wherein the first filter includes a first filter area and a second filter area, the first filter area is closer to the first main area than the second filter area, and the second filter area is closer to the second main area than the first filter area, and a temperature of the first filter area increases as a heating reaction occurs in the second filter area.

8. The air purification apparatus of claim 1, further comprising a heating unit configured to emit heat so that the air within the air purification apparatus is heated, wherein the first filter is coated with a first catalyst, and the heating unit emits heat so that a temperature of the second main area is Included in a predetermined temperature range, and wherein the predetermined temperature range at least includes an activation temperature of the first catalyst, when the air purification apparatus operates in the cleaning mode.

9. The air purification apparatus of claim 1, further comprising:

a first opening and closing member positioned between the first flow path and the first main area; and a second opening and closing member positioned between the second flow path and the second main area, wherein the first opening and closing member allows communication or closing between the first flow path and the first main area, the second opening and closing member allows communication or closing between the second flow path and the second main area, and when a temperature in at least a partial area within a main housing is lower than or equal to a predetermined cooling temperature, the first opening and closing member allows the first flow path and the first main area to communicate with each other, and the second opening and closing member allows the second flow path and the second main area to communicate with each other.

10. The air purification apparatus of claim 1, further comprising:

a first opening and closing member positioned between the first flow path and the first main area; and a second opening and closing member positioned between the second flow path and the second main area, wherein the first opening and closing member allows communication or closing between the first flow path and the first main area, the second opening and closing member allows communication or closing between the second flow path and the second main area, and when the air purification apparatus operates in the cleaning mode, the first opening and closing member allows at least a part between the first flow path and the first main area to be closed, and the second opening and closing member allows at least a part between the second flow path and the second main area to be closed.

11. The air purification apparatus of claim 1, further comprising a sub-pipe configured to communicate the second main area and the first main area, wherein the sub-pipe includes a second filter coated with a second catalyst, a first auxiliary area positioned between the second main area and the second filter, and a second auxiliary area positioned between the first main area and the second filter, a temperature of at least a part of the second auxiliary area is lower than a temperature of at least a part of the first auxiliary area when a temperature of the second catalyst is lower than an activation temperature of the second catalyst, and the temperature of at least a part of the second auxiliary area is higher than the temperature of at least a part of the first auxiliary area when the temperature of the second catalyst is higher than the activation temperature of the second catalyst.

* * * * *